United States Patent
Hashimoto et al.

(10) Patent No.: US 7,457,784 B2
(45) Date of Patent: Nov. 25, 2008

(54) CONTENTS MANAGEMENT APPARATUS, CONTENTS MANAGEMENT SYSTEM, CONTENTS MANAGEMENT METHOD, COMPUTER PRODUCT, AND CONTENTS DATA

(75) Inventors: Takako Hashimoto, Tokyo (JP); Takayuki Kunieda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 662 days.

(21) Appl. No.: 10/791,874

(22) Filed: Mar. 4, 2004

(65) Prior Publication Data

US 2004/0181613 A1  Sep. 16, 2004

(30) Foreign Application Priority Data

Mar. 10, 2003 (JP) ............................. 2003-063483

(51) Int. Cl.
*G06Q 90/00* (2006.01)
*G06Q 99/00* (2006.01)

(52) U.S. Cl. ........................................ 705/500; 705/52

(58) Field of Classification Search ................ 705/500, 705/51, 52
See application file for complete search history.

(56) References Cited

U.S. PATENT DOCUMENTS

| | | | | |
|---|---|---|---|---|
| 4,712,180 A * | 12/1987 | Fujiyama et al. | ............. | 434/323 |
| 5,008,875 A * | 4/1991 | Tomoda et al. | ................ | 369/85 |
| 5,765,167 A * | 6/1998 | Kiuchi et al. | ............... | 707/200 |
| 6,182,116 B1 * | 1/2001 | Namma et al. | .............. | 709/204 |
| 6,408,288 B1 * | 6/2002 | Ariyoshi | ..................... | 706/22 |
| 6,464,505 B1 * | 10/2002 | Pocock | ........................ | 434/219 |
| 6,677,957 B2 * | 1/2004 | Grzeszczuk et al. | ......... | 345/582 |
| 6,767,211 B2 * | 7/2004 | Hall et al. | .................... | 434/236 |
| 6,880,008 B1 * | 4/2005 | Yoneda | ........................ | 709/226 |
| 6,954,611 B2 * | 10/2005 | Hashimoto et al. | ......... | 455/3.01 |
| 6,957,205 B1 * | 10/2005 | Liongosari et al. | ............ | 706/45 |
| 7,035,868 B2 * | 4/2006 | Hashimoto et al. | .......... | 707/102 |
| 7,216,297 B1 * | 5/2007 | Douglis et al. | .............. | 715/760 |
| 2002/0033304 A1 * | 3/2002 | Watanabe et al. | ........... | 181/275 |
| 2002/0059349 A1 | 5/2002 | Wakita et al. | | |
| 2002/0071649 A1 * | 6/2002 | Aoki et al. | ..................... | 386/8 |
| 2002/0107895 A1 * | 8/2002 | Timmer | ..................... | 707/530 |
| 2003/0027592 A1 | 2/2003 | Hashimoto et al. | | |

(Continued)

FOREIGN PATENT DOCUMENTS

JP  62-186352  8/1987

(Continued)

OTHER PUBLICATIONS

Daywitt, L., et al., "Channel Computing Offers SQL Server Interface for Forest & Trees, Signs VAR," Business Wire, Jun. 27, 1989.*

(Continued)

*Primary Examiner*—Nicholas D Rosen
(74) *Attorney, Agent, or Firm*—Dickstein Shapiro LLP

(57) ABSTRACT

A contents management apparatus that manages contents including a plurality of contents elements representing information to be provided to a user includes a contents request acquiring unit that acquires contents request information from the user, a contents element extracting unit that extracts the contents elements based on the contents request information when the contents request acquiring unit acquires the contents request information from the user, and a contents restructuring unit that restructures new contents from the contents elements extracted.

26 Claims, 28 Drawing Sheets

U.S. PATENT DOCUMENTS

| | | | |
|---|---|---|---|
| 2003/0033333 A1* | 2/2003 | Nishino et al. | 707/531 |
| 2003/0041064 A1* | 2/2003 | Moskowitz et al. | 707/10 |
| 2003/0046276 A1* | 3/2003 | Gutierrez et al. | 707/3 |
| 2003/0065657 A1 | 4/2003 | Hashimoto et al. | |
| 2003/0105880 A1* | 6/2003 | Jasinschi | 709/247 |
| 2003/0126606 A1* | 7/2003 | Buczak et al. | 725/46 |
| 2003/0163784 A1* | 8/2003 | Daniel et al. | 715/514 |
| 2003/0191798 A1* | 10/2003 | Shimizu et al. | 709/202 |
| 2003/0220810 A1* | 11/2003 | Probert | 705/1 |
| 2004/0002039 A1* | 1/2004 | Draper et al. | 434/118 |
| 2004/0017511 A1 | 1/2004 | Kunieda | |
| 2004/0030729 A1 | 2/2004 | Yamagata et al. | |
| 2004/0181525 A1* | 9/2004 | Itzhak et al. | 707/5 |
| 2006/0031629 A1* | 2/2006 | Yoneda | 711/111 |

FOREIGN PATENT DOCUMENTS

| | | |
|---|---|---|
| JP | 2001-265207 | 9/2001 |
| JP | 2001-306707 | 11/2001 |
| JP | 2002-007418 | 1/2002 |

OTHER PUBLICATIONS

Sato, H., et al. "Group Learning Using Dynamic Editable Virtual Space" (Abstract only), NTT R&D, 1999.*

Anon., "Tcert Unveils Edapt: e-Learning Platform with a Brain," Business Wire, Sep. 25, 2000.*

Anon., "Edapt or Die: How Tcert's Technology Is Transforming Training into a Competitive Advantage," PR Newswire, Oct. 4, 2000.*

Anon., "WordWave Extends Partnership with Convera for Video Indexing Service; Joint Sales, Marketing and Referral Agreements to Add Reach to WordWave's Searchable Streaming Media Initiative," Business Wire, May 1, 2001.*

Anon., "Lightspeed Introduces New Xml-Based E-Learning Application and Content Delivery Solution," PR Newswire, Jul. 10, 2001.*

Iribe, Y., et al., "Proposal of Related Information Providing System on Distributed VOD" (Abstract only), Proceedings of the IEEE Workshop on Knowledge Media Networking, 2002, pp. 43-48.*

Vissering, D., "San Diego State U.: Rating Sites Give Professor Previews," University Wire, Apr. 15, 2003.*

Corry, C., "eLearning Seeks $8M for Marketing," LI Business News, vol. 47, No. 8, p. 4A, Feb. 25, 2000.*

Anon., "Intelligent Tutor Determines Know-how," Electronics Weekly, May 3, 2000.*

Cooke, A., "Quality of Health and Medical Information on the Internet," British Journal of Clinical Governance, vol. 4, No. 4, pp. 155-160, 1999.*

* cited by examiner

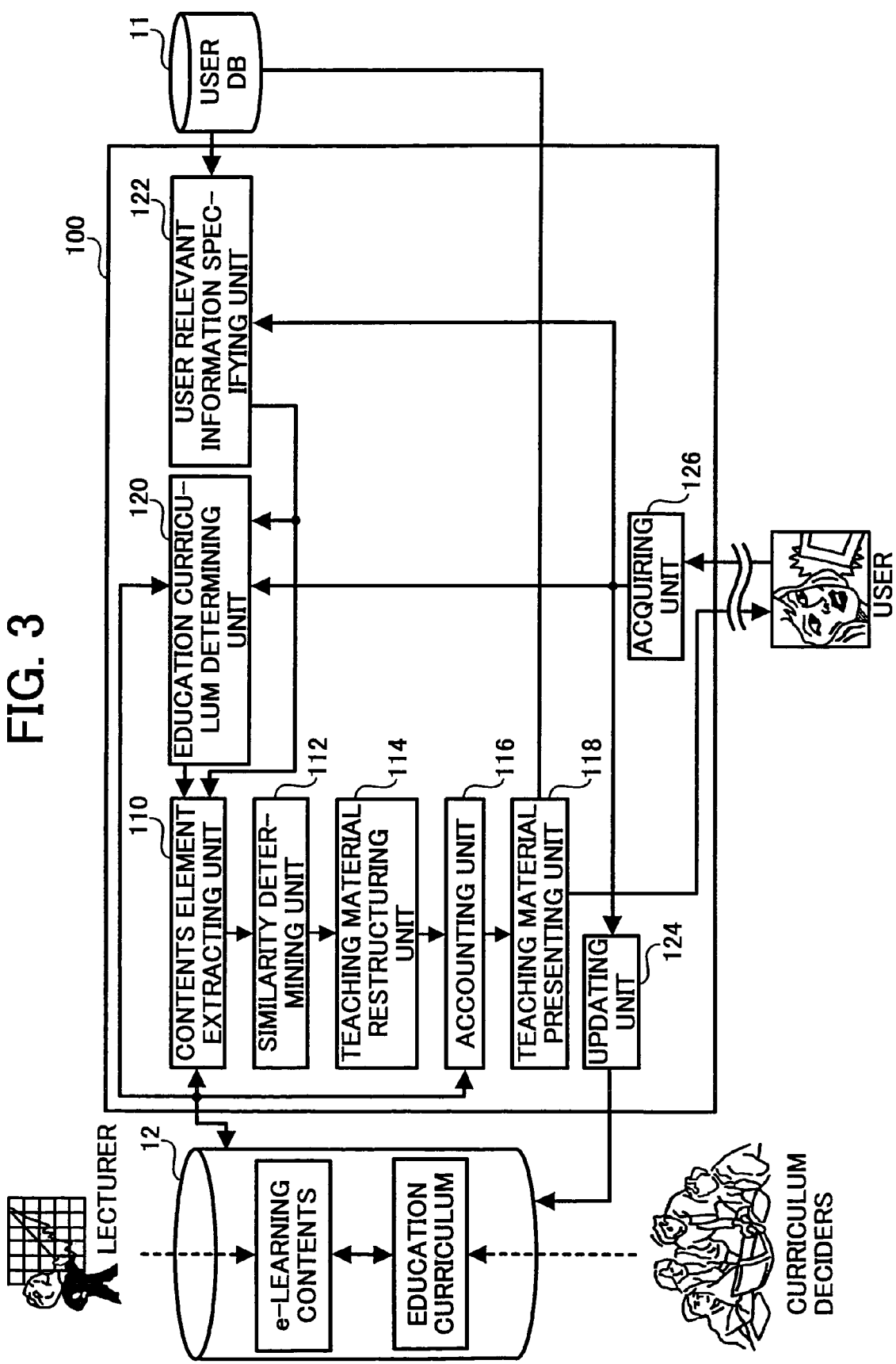

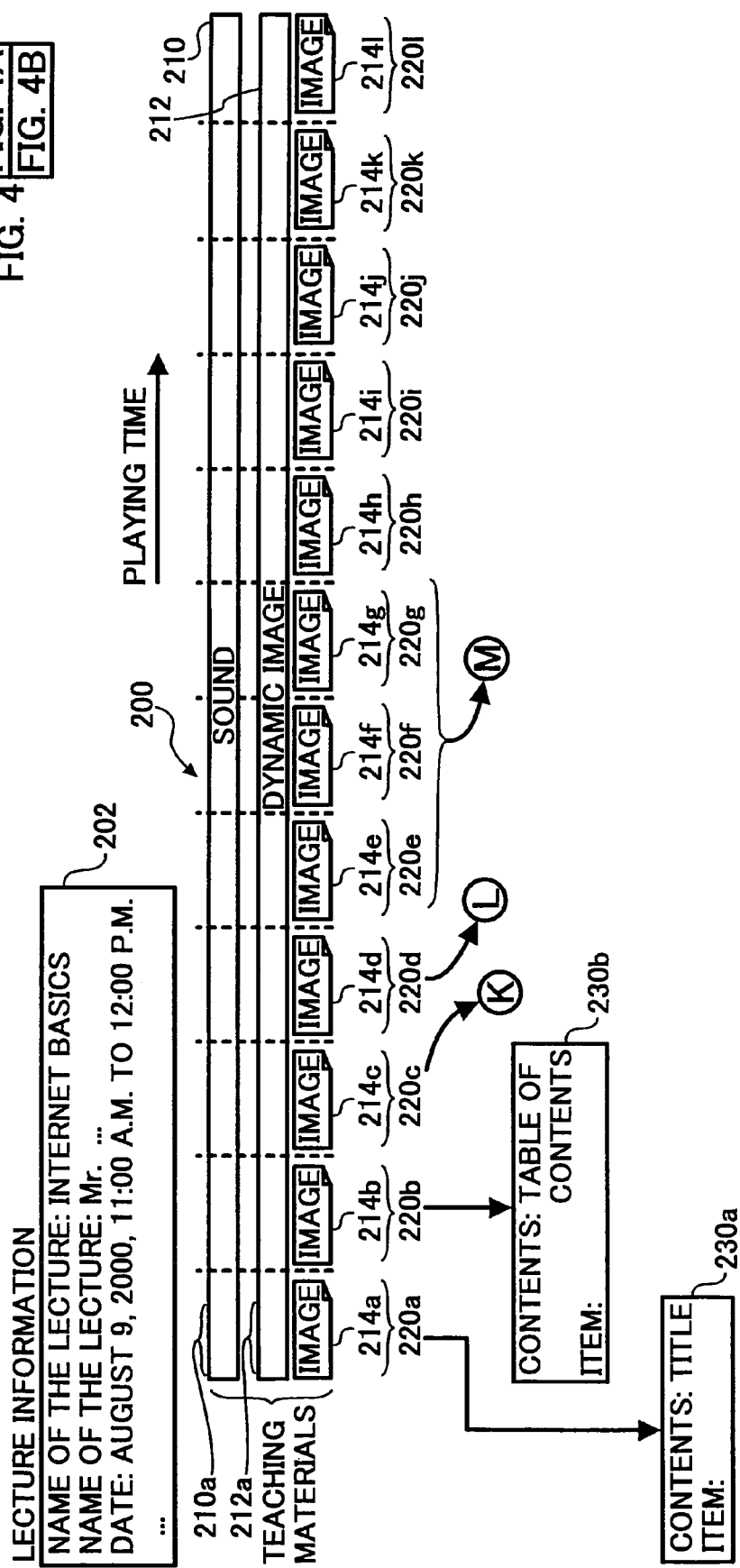

FIG. 5A

| FIG. 5 | FIG. 5A |
|---|---|
| | FIG. 5B |

```
<MPEG-7>
<TemporalDecomposition id="temporalDecomposition-5" criteria="structure" overlap="true" gap="true">
  <AudioVisualSegment id="structure-6">
    <StructuralUnit href="urn:ricoh:mmVISION:SegmentTypeCS:4">
      <Name xml:lang="en">structure</Name>
    </StructuralUnit>
    <PointOfView viewpoint="KNOWLEDGE LEVEL">
      <SupplementalInformation>
        <FreeTextAnnotation>CONTENTS LEVEL OF THIS CONTENTS ELEMENT</FreeTextAnnotation>
      </SupplementalInformation>
      <Importance>
        <Value>1</Value>
      </Importance>
    </PointOfView>
    <PointOfView viewpoint="LEVEL OF IMPORTANCE">
      <SupplementalInformation>
        <FreeTextAnnotation>ABSOLUTE LEVEL OF IMPORTANCE OF THIS CONTENTS ELEMENT</FreeTextAnnotation>
      </SupplementalInformation>
      <Importance>
        <Value>100</Value>
      </Importance>
```

FIG. 5B

```
</PointOfView>
<PointOfView viewpoint="POPULARITY RATING">
    </SupplementalInformation>
        <FreeTextAnnotation>POPULARITY RATING DETERMINED BY FEEDBACK FROM USER
        </FreeTextAnnotation>
    </SupplementalInformation>
    <Importance>
        <Value>80</Value>
    </Importance>
</PointOfView>
<MediaTime>
    <MediaRelTimePoint
mediaTimeBase="ancestor:Description/MultimediaContent[1]/AudioVisual[1]MediaTime[1]">P0DT0H0
M0S0N30F</MediaRelTimePoint>
        <MediaIncrDuration mediaTimeUnit="P0DT0H0M0S1N30F">1800</MediaIncrDuration>
    </MediaTime>
</AudioVisualSegment>

<AudioVisualSegment id="structure-7">
</AudioVisualSegment>

</TemporalDecomposition>

</MPEG-7>
```

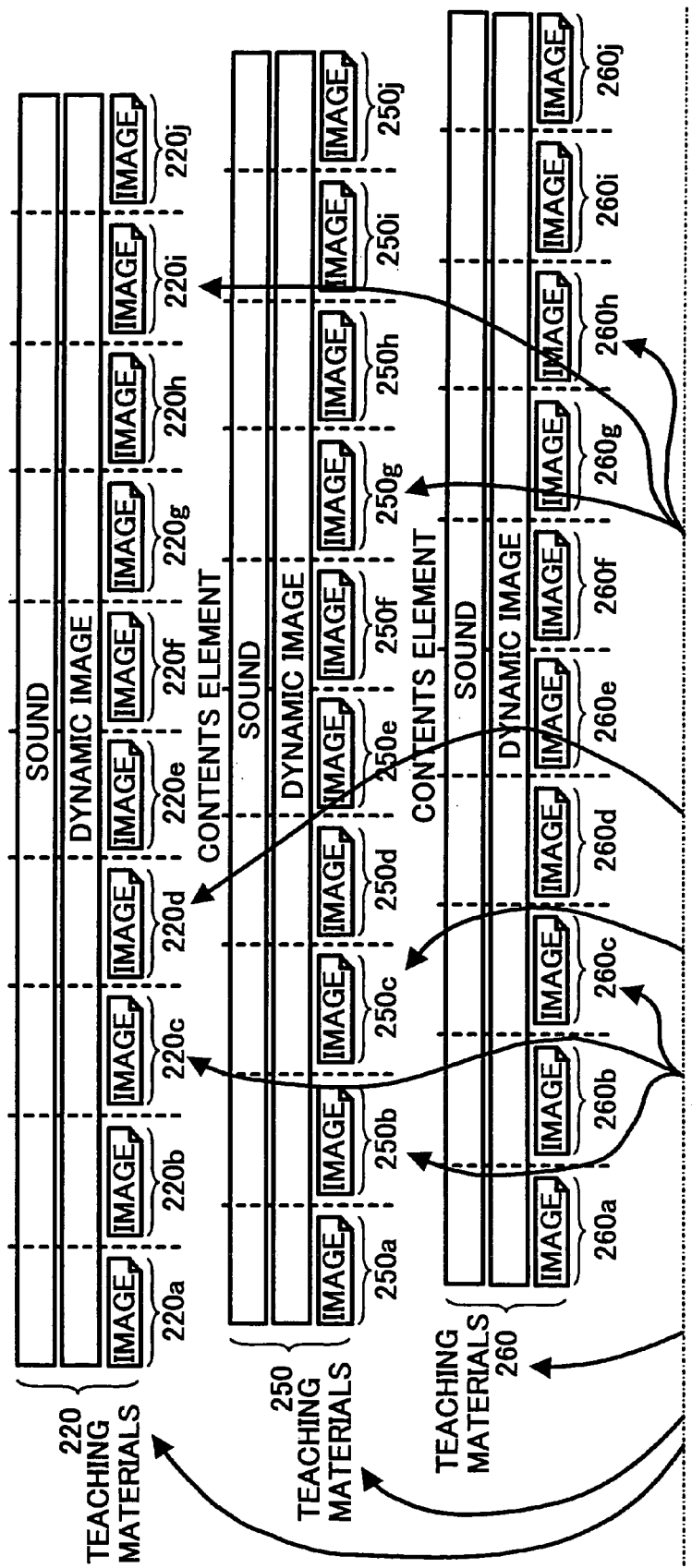

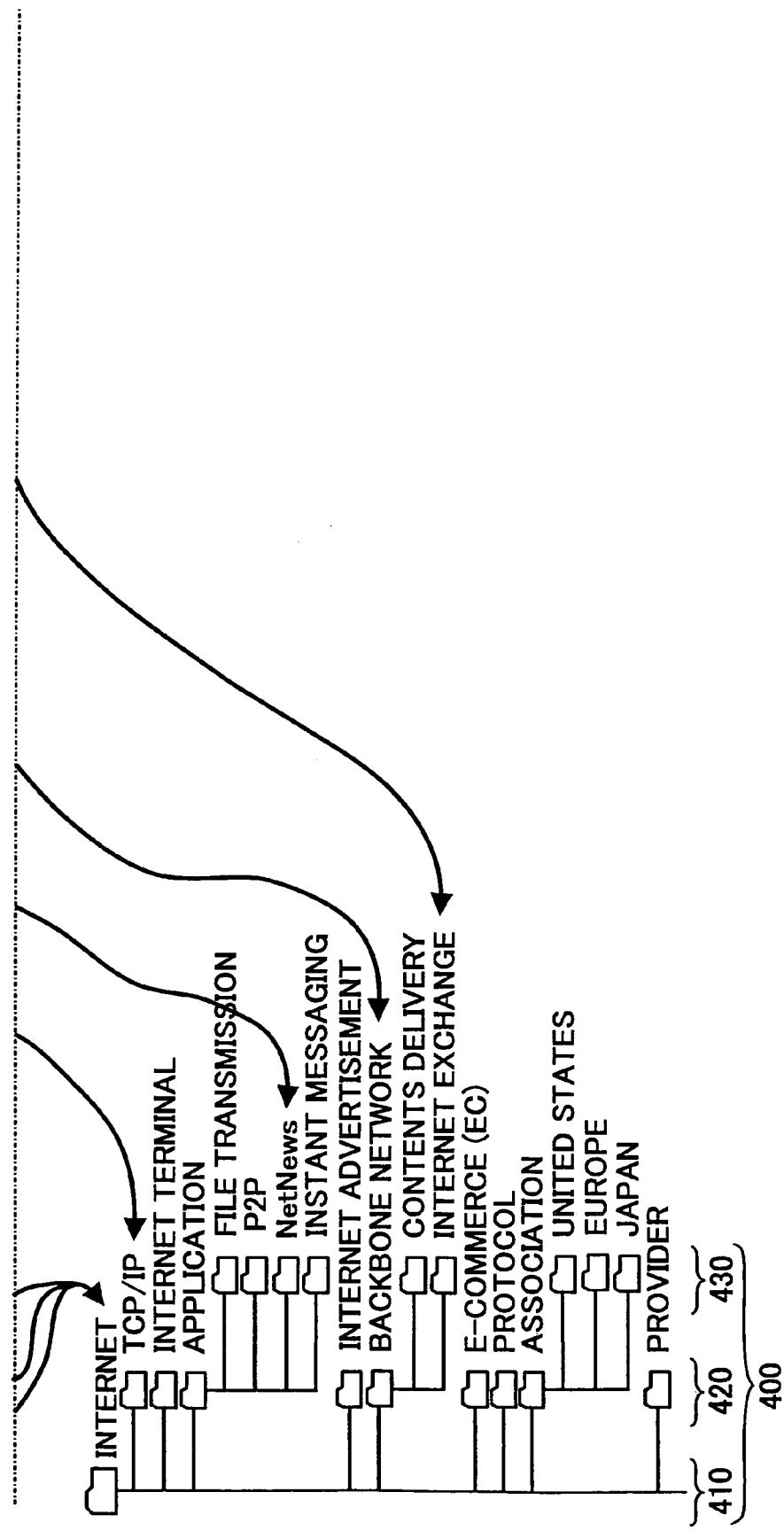

| USER ID | 234567 |
|---|---|

| USER ID | 123456 |
|---|---|

| LEARNING LEVEL | INTERNET: ADVANCED<br>OBJECT PREFERENCE: BEGINNER<br>⋮ |
|---|---|
| ATTENDANCE RECORD | INTERNET TCP/IP: 2002/05/25<br>　　　AP/FILE TRANSMISSION: 2002/05/25<br>　　　AP/P2P: 2002/06/02<br>　　　SOAP: 2002/06/03<br>⋮ |
| | OBJECT PREFERENCE<br>⋮ |
| EXAMINATION RECORD | INTERNET TCP/IP: 2002/05/25<br>⋮ |

410

| USER ID | 123456 | 411 |
|---|---|---|

| ○ ITEM OF THE APPLICATION FOR LECTURE | PROTOCOL ▼ | 412 |
|---|---|---|

| ○ DESIRED LECTURE | ▼ | 413 |
|---|---|---|

| ○ DESIRED LECTURE | ▼ | 414 |
|---|---|---|

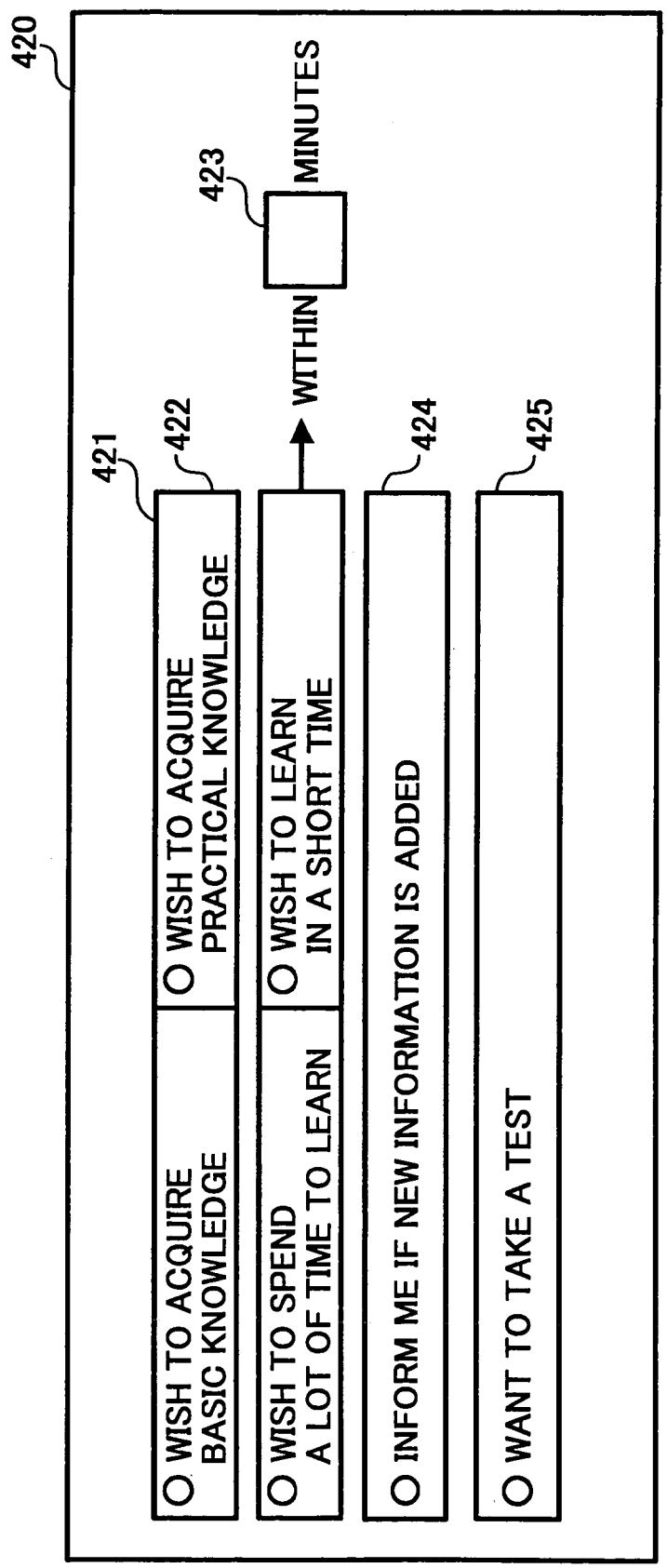

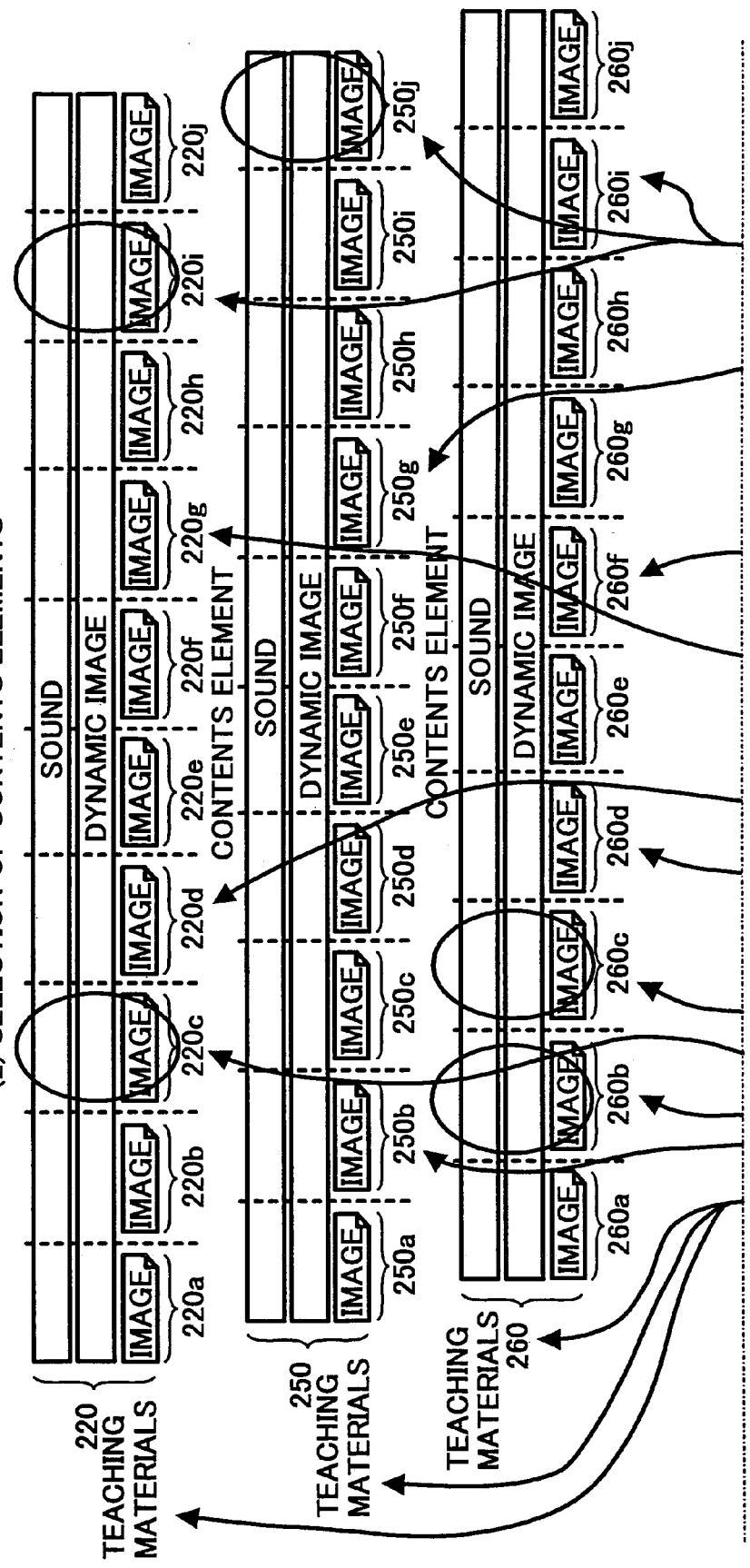

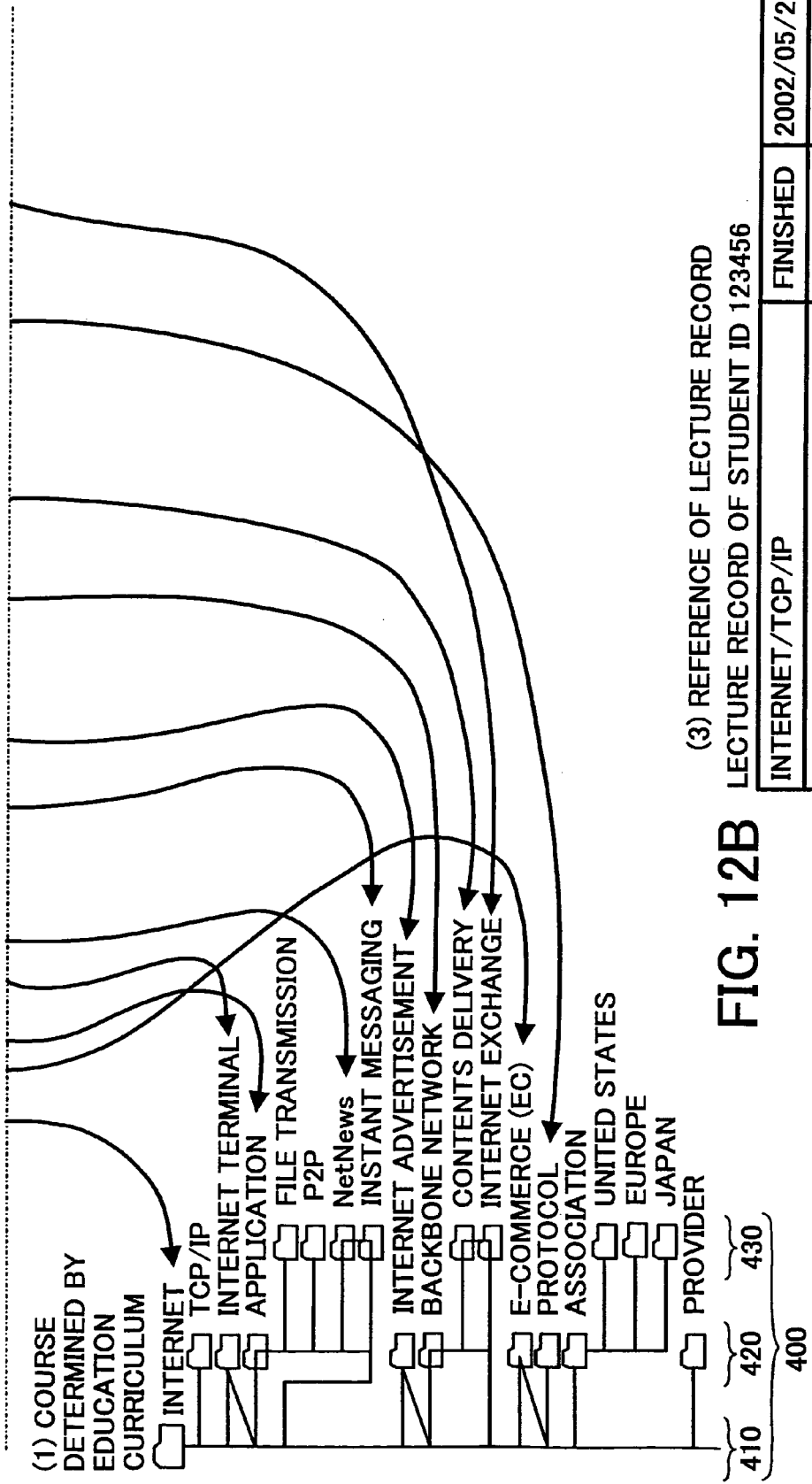

FIG. 13

LECTURE CURRICULUM (TEACHING MATERIAL ID ABCDE)

| USER ID | 123456 |
|---|---|
| NAME | MR. .... |

| No | CONTENTS | TIME |
|---|---|---|
| 1 | INTERNET TERMINAL/ALL | 5 |
| 2 | (1) APPLICATION/Net News | 20 |
|   | (2) APPLICATION/INSTANT MESSAGING | 15 |
| 3 | INTERNET ADVERTISEMENT/ALL | 10 |
| 4 | (1) BACKBONE NETWORK/CONTENTS DELIVERY | 20 |
|   | (2) BACKBONE NETWORK/INTERNET EXCHANGE | 10 |
| 5 | E-COMMERCE (EC) | 10 |
| 6 | PROTOCOL | 20 |
| 7 | CONFIRMATION EXAMINATION (ADVANCED LEVEL) | 10 |

( REQUEST CHANGE )    ( DEFINE )    ( FEE INFORMATION )

FIG. 14

| USER ID | 123456 |
|---|---|

| LEARNING LEVEL | ..... | | |
|---|---|---|---|
| ATTENDANCE RECORD | INTERNET | INTERNET TERMINAL | 2002/10/30 |
| | | AP/Net News | 2002/10/30 |
| | | AP/INSTANT MESSAGING | 2002/10/30 |
| | | INTERNET ADVERTISEMENT | 2002/10/30 |
| | | BACKBONE NETWORK | 2002/10/30 |
| | | E-COMMERCE (EC) | 2002/10/30 |
| | | PROTOCOL | |
| | | ..... | |

FIG. 15

| TEACHING MATERIAL ID | ABCDE |

COMMENTS ON LECTURES

| 1 | INTERNET TERMINAL | CONTENTS | 1 | 2 | 3 | 4 | 5 |
| | | TIME | 1 | 2 | 3 | 4 | 5 |
| | | LECTURE | 1 | 2 | 3 | 4 | 5 |
| | | LEVEL | 1 | 2 | 3 | 4 | 5 |

ANY OTHER COMMENTS OR REQUESTS

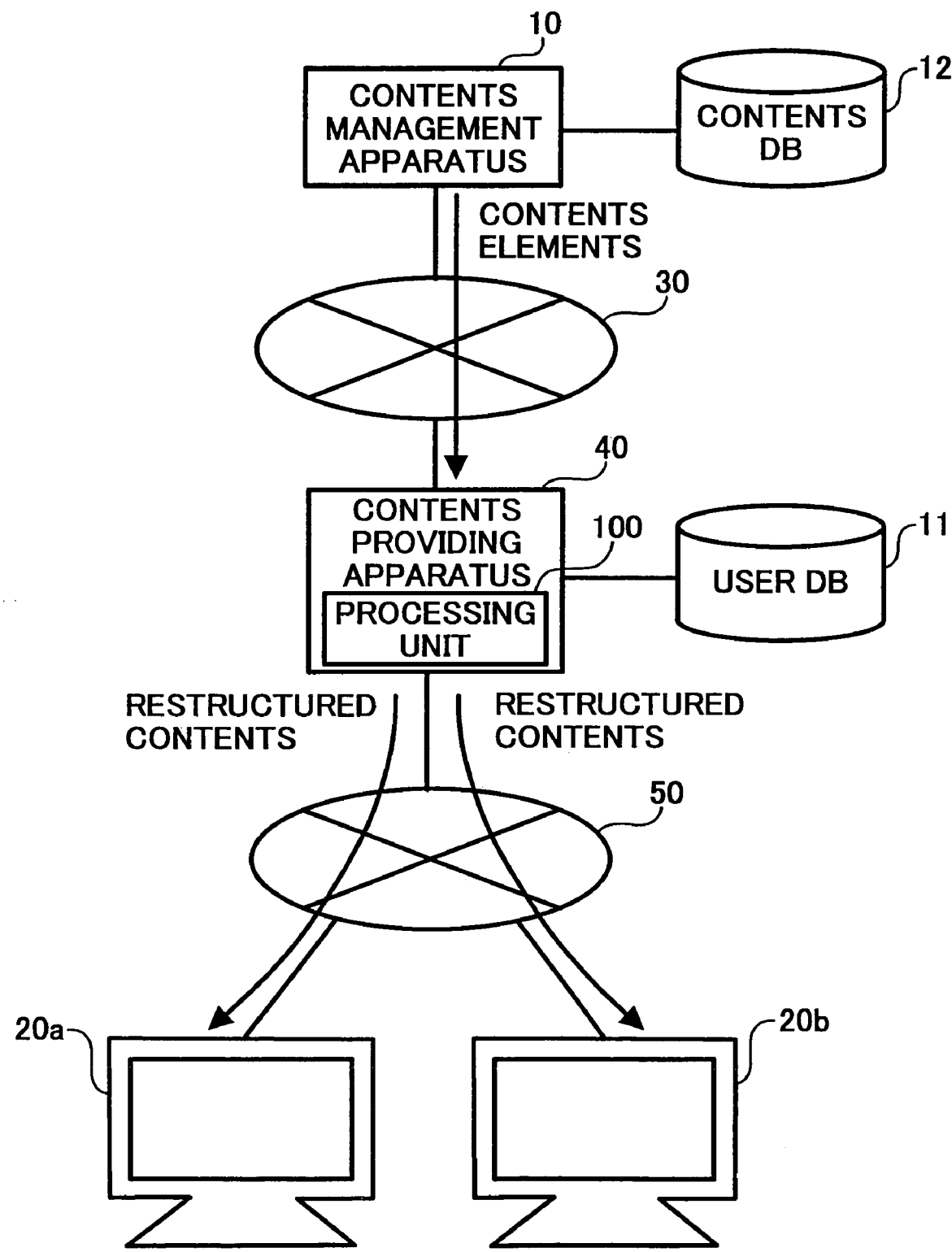

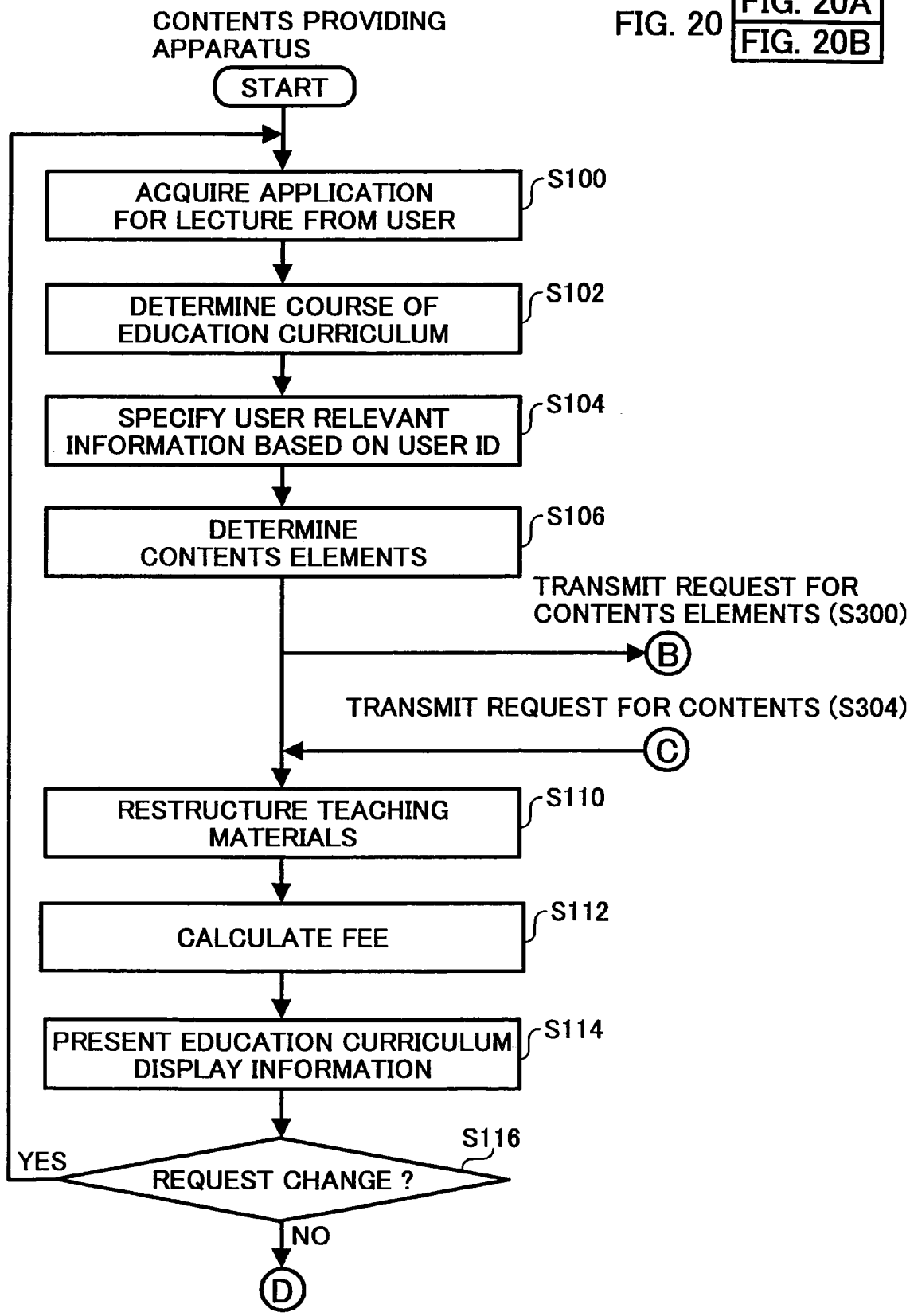

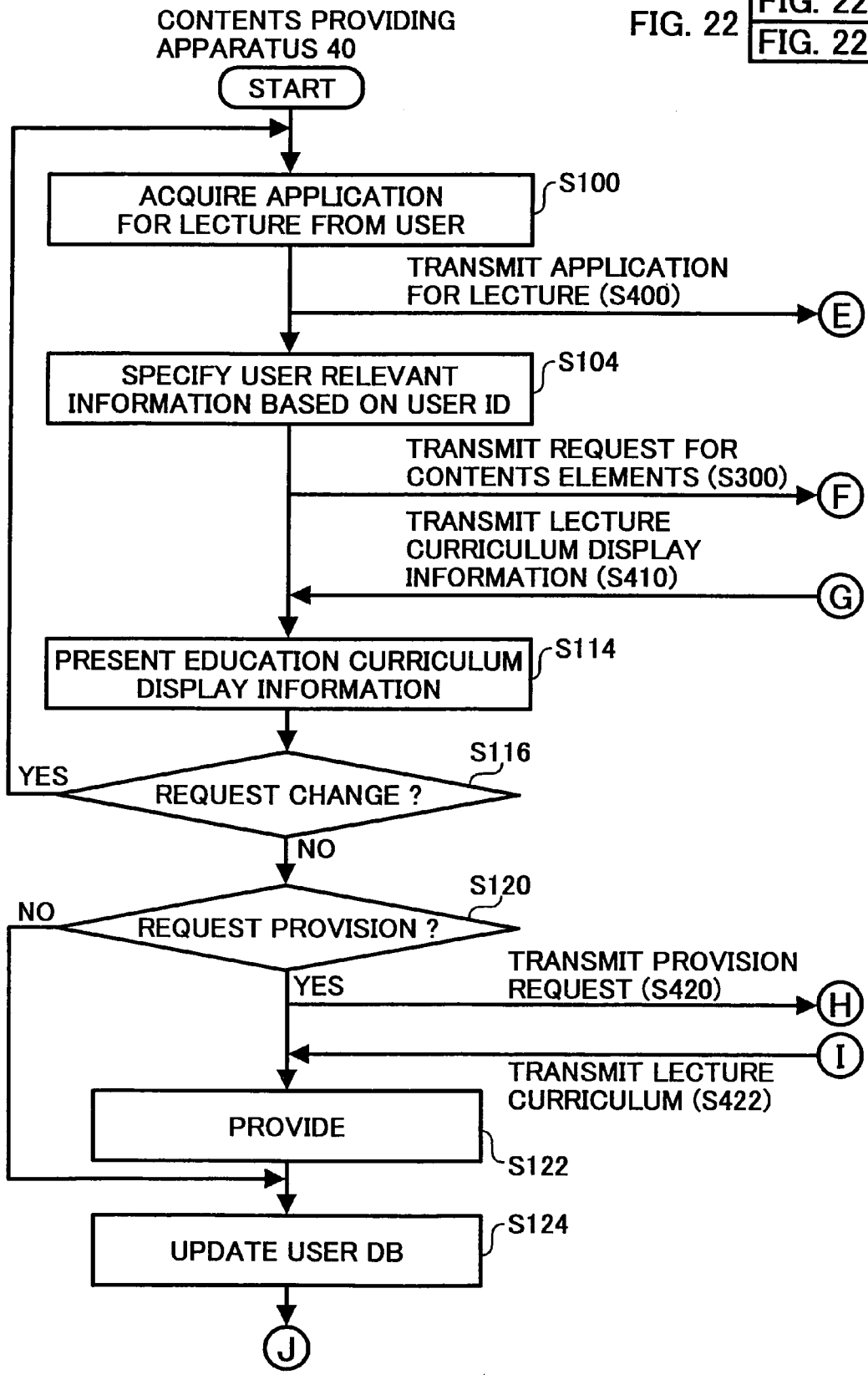

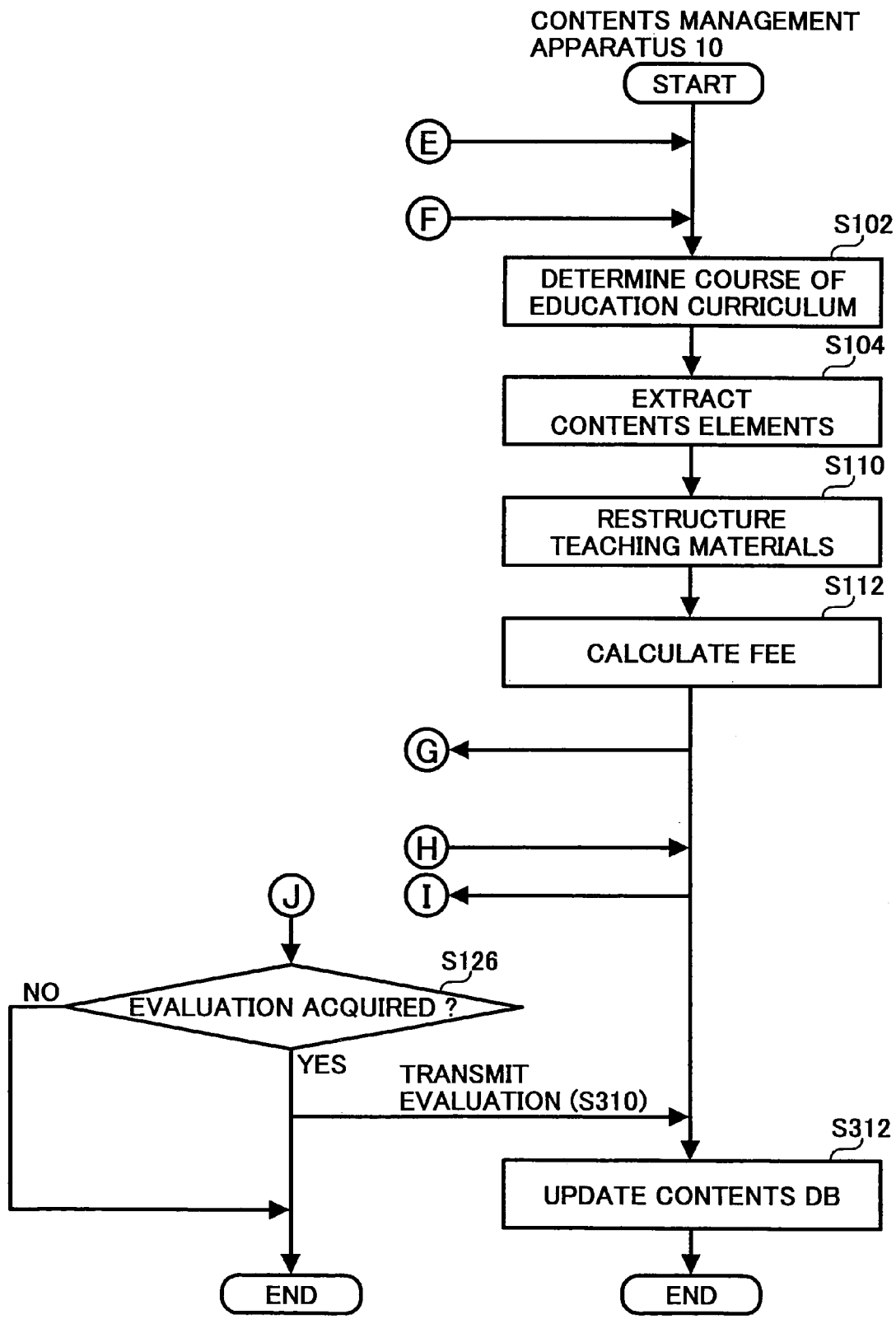

CONTENTS MANAGEMENT APPARATUS, CONTENTS MANAGEMENT SYSTEM, CONTENTS MANAGEMENT METHOD, COMPUTER PRODUCT, AND CONTENTS DATA

CROSS-REFERENCE TO RELATED APPLICATIONS

The present document incorporates by reference the entire contents of Japanese priority document, 2003-063483 filed in Japan on Mar. 10, 2003.

BACKGROUND OF THE INVENTION

1) Field of the Invention

The present invention relates to a technology for managing contents that includes a plurality of contents-elements representing information to be provided to users.

2) Description of the Related Art

Recent spread of the Internet enabled users to obtain various pieces of information through a network. A relevant technology is to assign an index to multimedia information provided to the users so that the users can search for desired information efficiently (for example, see Japanese Patent Application Laid-Open No. 2002-7418). All those technologies are making an improvement on convenience of the Internet.

One of So-called "killer applications" that made a contribution to the spread of the Internet is "e-learning". This is a method of conducting an education by providing teaching materials using a personal computer (PC) or a computer network. Compared with learning in a classroom, it has excellent advantages such as providing an education to remote areas, leaning at users' convenience at any time during 24 hours a day and 365 days a year, and utilization of teaching materials unique to the computer.

In recent years, however, proliferation of massive information sometimes causes unnecessary information to be provided to the users. Such unnecessary information only increases a communication data amount, resulting in a heavy traffic communication lines. Besides, it gives the users a hard time with letting them select desired information from among a bunch of extraneous information.

Particularly in the e-learning, since most learners are busy, an attention is paid to how to provide learning contents that satisfy the learners' needs efficiently.

From this viewpoint, it is highly desired to provide a technology that can provide information satisfying all the required needs to the users efficiently not more and not less than needed.

SUMMARY OF THE INVENTION

It is an object of the present invention to solve at least the problems in the conventional technology.

The contents management apparatus according to one aspect of the present invention manages contents including a plurality of contents elements representing information to be provided to a user, including a contents request acquiring unit that acquires contents request information from the user, a contents element extracting unit that extracts the contents elements based on the contents request information when the contents request acquiring unit acquires the contents request information from the user, and a contents restructuring unit that restructures new contents from the contents elements extracted.

The contents management system according to another aspect of the present invention includes a contents management apparatus that manages contents including a plurality of contents elements representing information to be provided to a user, and a contents providing apparatus that provides the contents to the user. The contents providing apparatus includes a contents request acquiring unit that acquires contents request information from the user, a contents element extracting unit that extracts the contents elements based on the contents request information when the contents request acquiring unit acquires the contents request information from the user, a contents restructuring unit that restructures new contents from the contents elements extracted, and a contents providing unit that provides the new contents to the user. The contents management apparatus includes a contents storage unit that stores a plurality of contents from which the contents element extracting unit of the contents providing apparatus extracts the contents elements. The contents management apparatus and the contents providing apparatus communicate with each other via a network.

The contents management system according to still another aspect of the present invention includes a contents management apparatus that manages contents including a plurality of contents elements representing information to be provided to a user, and a contents providing apparatus that provides the contents to the user. The contents management apparatus includes a contents request acquiring unit that acquires contents request information from the user, a contents element extracting unit that extracts the contents elements based on the contents request information when the contents request acquiring unit acquires the contents request information from the user, a contents restructuring unit that restructures new contents from the contents elements extracted, and a contents providing unit that provides the new contents to the user. The contents providing apparatus includes an output unit that outputs the contents acquired from the contents providing apparatus via a network, and a user information storage unit that stores user relevant information about the user to whom the contents are provided. The contents element extracting unit of the contents management apparatus extracts the contents elements determined based on the user relevant information stored in the user information storage unit.

The method according to still another aspect of the present invention manages contents including a plurality of contents elements representing information to be provided to a user. The method includes acquiring contents request information from the user, extracting the contents elements based on the contents request information when the contents request acquiring unit acquires the contents request information from the user, and restructuring new contents from the contents elements extracted.

The computer program according to still another aspect of the present invention realizes a method according to the above aspect of the present invention.

The computer readable recording medium according to still another aspect of the present invention stores a computer program according to the above aspect of the present invention.

Contents data according to still another aspect of the present invention includes a plurality of contents element data including lecture contents information that includes at least one of moving image data, sound data, and still image data, and meta contents description information related to the data, corresponding to at least one of the contents data and the contents element data. The meta contents description information includes lecture relevant information and inter-data information representing relation between the contents data, between the contents element data, and between the contents data and the contents element data.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a schematic diagram for illustrating a functional configuration of a processing unit that performs a process relating to contents management in a contents management apparatus according to the first embodiment;

FIG. 5 is a description example of meta contents description information explained in FIG. 4;

FIG. 6 is a schematic diagram for illustrating a relation between contents data and an education curriculum;

FIG. 10 is a schematic diagram of a second input screen displayed on the display unit of the user terminal;

FIGS. 12A-1, 12A-2 and 12B are schematic diagrams of an example of restructured contents;

FIG. 13 is a schematic diagram of lecture curriculum display information displayed on the display unit 22 at step S114 in FIG. 11;

FIG. 14 is a schematic diagram of updated user relevant information;

FIG. 15 is a schematic diagram of an evaluation input screen for inputting evaluations of course contents taken;

FIG. 19 is a schematic diagram of a contents management system according to a second embodiment of the present invention;

FIG. 22 is a flowchart of a process procedure when the contents management system provides contents to a user according to the third embodiment;

DETAILED DESCRIPTION

Exemplary embodiments of a contents management apparatus, a contents management system, a contents management method, a computer product, and contents data are explained in detail below with reference to the accompanying drawings.

The embodiments explain the contents management system including the contents management apparatus according to the present invention. Contents to be managed by the contents management system in the embodiments include dynamic image data, sound data, and still image data. Specifically, the contents are data representing lecture contents. The contents in the embodiments include image data and sound data obtained by recording lecture scenes, and still image data displayed on a display device such as a large panel in the lecture.

The contents may be text data, or complex data of text data, the dynamic image data, and the like. The contents may be data which are effective for obtaining any information by a user, and their type is not particularly limited. The contents in the embodiments are complex data including dynamic image data, sound data, and still image data. Specifically, the contents are teaching materials in which lecture contents relating to a computer are recorded, for example.

Figure 1:
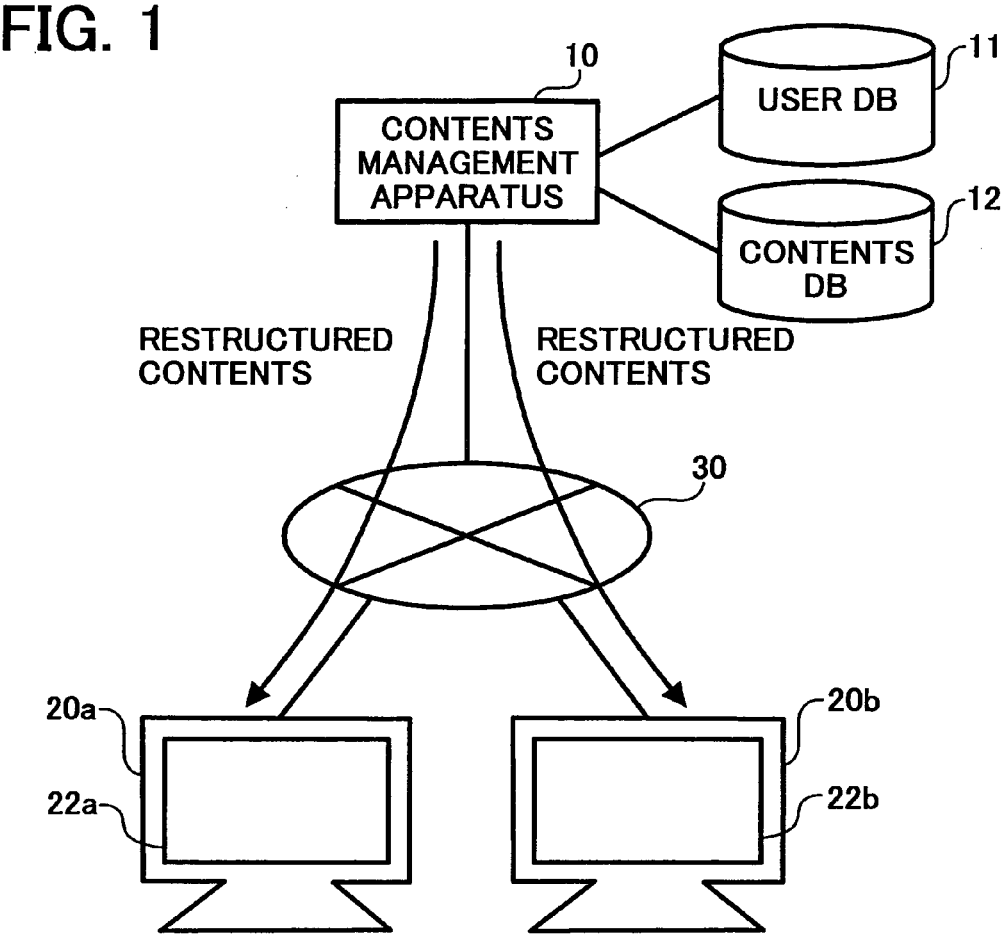
FIG. 1 is a schematic diagram of a contents management system according to a first embodiment of the present invention.

FIG. 1 is a schematic diagram of a contents management system according to a first embodiment of the present invention. The contents management system 1 includes a contents management apparatus 10 which manages contents including a plurality of contents elements representing information to be provided to a user, and user terminals 20a and 20b which can communicate with the contents management apparatus 10 via a network 30. The network 30 can be the Internet, a local area network (LAN), or a wide area network (WAN).

The contents management apparatus 10 has a user DB 11, and a contents DB 12. The user DB 11 stores user relevant information about users to whom contents to be managed by the contents management apparatus 10 are provided. The contents DB 12 stores the contents to be managed by the contents management apparatus 10. More specifically, the user DB 11 stores user IDs for identifying the users and the user relevant information in a related manner. The user relevant information includes knowledge levels of subjective themes, interested fields, and course record information of the users.

The contents stored in the contents DB 12 are stored in the following manner. Namely, an education curriculum decider structures an education curriculum, and information, which represents the structured education curriculum, namely, a course on which a user learns a predetermined theme, is stored in the DB 12. Lecturers who deliver lectures relating to respective themes add information about knowledge levels, being essential, and the like to information about lectures delivered by the lecturers. The lecture information completed in such a manner, namely, the contents are related with the education curriculum and are stored in the contents DB 12.

The contents management apparatus 10 according to the first embodiment restructures new contents which meet users' requests based on the data stored in the contents DB 12 and the user DB 11 according to the requests from the users at the user terminal 20. It provides the restructured contents to the user terminal 20 via the network 30.

Figure 2:
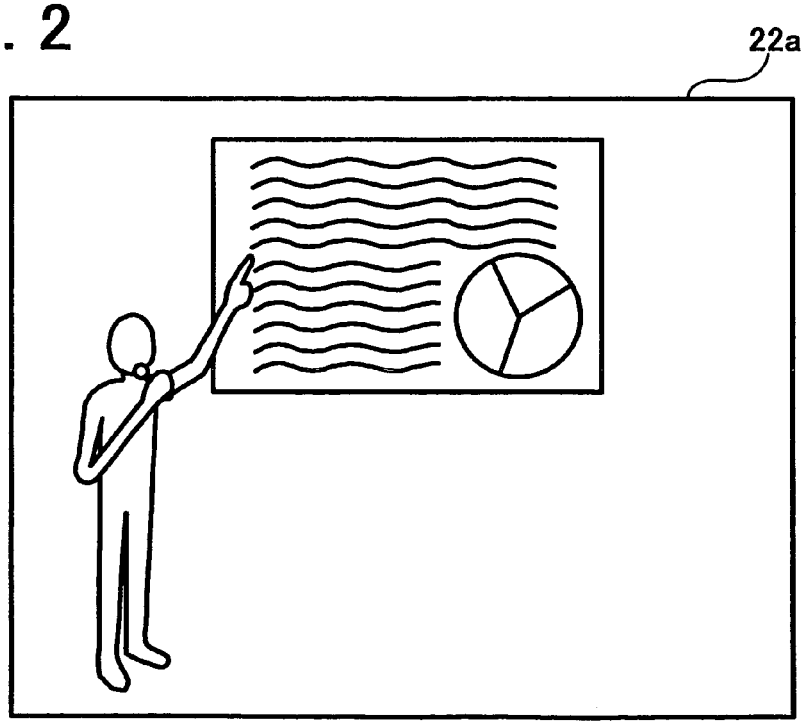
FIG. 2 is a schematic diagram for illustrating contents displayed on a display unit of a user terminal according to the first embodiment.

FIG. 2 is a schematic diagram for illustrating contents displayed on a display unit 22a of a user terminal 20a according to the first embodiment. When a user requests teaching materials relating to a desired learning theme using the user terminal 20a via the network 30, the user can get the teaching materials including an image, a sound and a still image obtained by recording lecture contents which meet the user's request.

FIG. 3 is a schematic diagram for illustrating a functional configuration of a processing unit 100 that performs a process relating to contents management in a contents management apparatus 10 according to the first embodiment.

The processing unit 100 includes a contents element extracting unit 110, a similarity determining unit 112, a teaching material restructuring unit 114, an accounting unit 116, a teaching material presenting unit 118, an education curriculum determining unit 120, a user relevant information specifying unit 122, an updating unit 124, and an acquiring unit 126.

The teaching material restructuring unit 114 and the education curriculum determining unit 120 compose a contents restructuring unit according to the present invention. The teaching material presenting unit 118 composes a presenting unit according to the present invention. The acquiring unit 126 composes a specification acquiring unit and a user identifying information acquiring unit according to the present invention.

The acquiring unit 126 acquires a contents request representing a user's request for contents. The contents request includes information about what contents the user wishes to learn and how the user wishes to learn in the e-learning environment, namely, contents desired by the user, information about a genre of the teaching materials and learning levels, and a user ID. Namely, the acquiring unit 126 acquires these pieces of information.

The user relevant information specifying unit 122 receives the contents request from the acquiring unit 126. It specifies the user relevant information related with the user ID included in the contents request in the user DB 11.

The education curriculum determining unit 120 receives the contents request from the acquiring unit 126, and receives the user relevant information specified by the user relevant information specifying unit 122. The education curriculum determining unit 120 determines an education curriculum relating to the learning contents included in the teaching materials to be presented to the user based on the information in the contents request and the user relevant information. The education curriculum means a structuring order of the contents elements corresponding to the learning contents.

The contents element extracting unit 110 extracts the contents elements stored in the contents DB 12 based on the contents request at the time when the acquiring unit 126 acquires the contents request. The contents element extracting unit 110, more specifically, determines the contents elements to be extracted based on the education curriculum determined by the education curriculum determining unit 120 and the user relevant information specified by the user relevant information specifying unit 122 so as to extract the determined contents elements.

The similarity determining unit 112 determines similarity between the contents elements extracted by the contents element extracting unit 110. Namely, it determines the similarity between the contents elements to be restructured by the teaching material restructuring unit 114, mentioned later.

The teaching material restructuring unit 114 restructures new teaching materials, namely, the contents from the contents elements extracted by the contents element extracting unit 110. When the similarity determining unit 112 determines that predetermined two contents elements are similar, the teaching material restructuring unit 114 adds only one of the two contents elements to the new contents. This can avoid addition of an overlapped contents element to the contents.

The accounting unit 116 gathers accounting information about the restructured contents based on accounting information related with the contents elements included in the contents by the teaching material restructuring unit 114. The teaching material presenting unit 118 provides the contents and the like restructured by the teaching material restructuring unit 114 to the user via the network 30. The updating unit 124 updates the contents element relevant information related with the contents element in the contents DB 12.

Figure 4B:
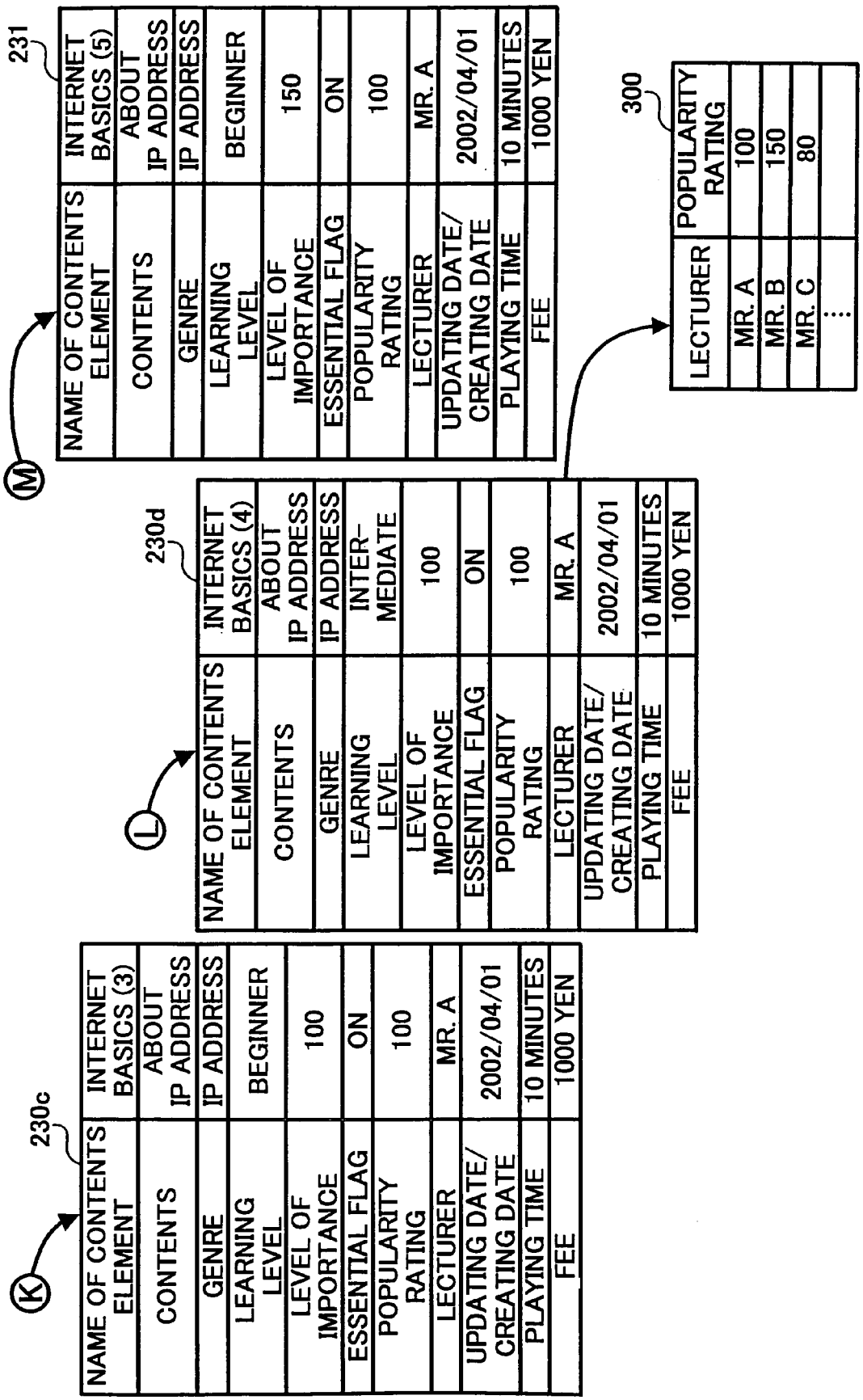
FIG. 4 is a schematic diagram for illustrating a data structure of the contents stored in a contents DB.

FIG. 4 is a schematic diagram for illustrating a data structure of the contents stored in a contents DB. Contents data, namely, e-learning contents 200 has three kinds of data including sound data 210, dynamic image data 212, and still image data 214. The e-learning contents 200 are related with lecture relevant information. The lecture relevant information includes the name of lectures, the name of lecturers, the date of lectures, the place of lectures, and the like.

The three kinds of data including the sound data 210, the dynamic image data 212, and the still image data 214 are managed as a plurality of contents elements 210a, 210b, . . . , which are divided with arbitrary intervals along a time base based on the lecture contents. The contents element 210 includes a part 210a of the sound data 210, a part 212a of the dynamic image data 212, and the still image data 214a. The still image data 214a are data of an image included in the dynamic image data 212a displayed on the display panel, for example.

For example, when one content includes the data representing a plurality of the lecture contents lectured for one day, one contents element may be allocated to each theme of the lecture. One content is divided into a plurality of contents elements, and the contents elements are the minimal unit in the restructure of the teaching materials.

The contents elements 210a, 210b, . . . are related with meta contents description information 230a, 230b, . . . including the contents element relevant information relating to the contents elements.

For example, the meta contents description information 230c related with the contents element 220c includes the name of contents elements, lecture contents, genres, the learning level of the user to which the content is provided, the level of importance of the contents elements, essential flags, the popularity rating, the name of lecturers, the updating date or creating date of the contents elements, the playing time, and the contents elements providing fee as the contents element information. The essential flag represents whether the contents are fundamental when the user learns the genre of the contents elements. The popularity rating is determined by feedback from users who browse the contents elements.

The contents DB 12 further stores a lecturer table 300 in which lecturers are related with the popularity ratings. The popularity ratings of the lecturers included in the meta contents description information 231 can be specified based on the lecturer table 300.

The meta contents description information 231 are related with three contents elements 220f, 220g and 220h. The related relationship between the meta contents description information and the contents elements is not limited to a one-to-one basis, and the one piece of the meta contents description information may be related with a plurality of contents elements.

The contents elements are related with the level of importance, the popularity rating, the updating date, creating date, the popularity rating of lecturers of the contents elements, and the playing time so as to be stored in the contents DB 12. Therefore, the contents element extracting unit 110 can determine and extract the contents elements which should be included in the contents to be provided to the user based on the contents element relevant information. The contents DB 12 stores a plurality of contents explained in FIG. 4, and the contents element extracting unit 110 extracts contents elements from the respective contents stored in the contents DB 12.

One content is divided into a plurality of contents elements, and information about their contents and knowledge levels, levels of importance, and popularity ratings are added as the meta contents description information per unit of contents element. Therefore, the contents can be analyzed more flexibly.

A lecturer can specify the contents element or attribute information such as the level of importance in the plural contents elements and the popularity ratings as the meta contents description information of one or plural contents elements. More reliable meta contents description information can be, therefore, added. Since a lecturer's aim can be added as the meta contents description information, the lecturer's aim can be reflected on the restructure of teaching materials. The level of importance may be determined by the popularity rating of lecturers, a lecturing method, and the like.

FIG. 5 is a description example of meta contents description information explained in FIG. 4. In the present embodiment, the meta contents description information is described according to Moving Pictures Expert Group-7 (MPEG-7) (multimedia content description interface). The MPEG-7 is a standard technique of the description method which is used for searing for multimedia contents such as dynamic images and sounds effectively. The description is performed according to the MPEG-7, so that contents elements can be extracted and searched easily.

Figure 7:
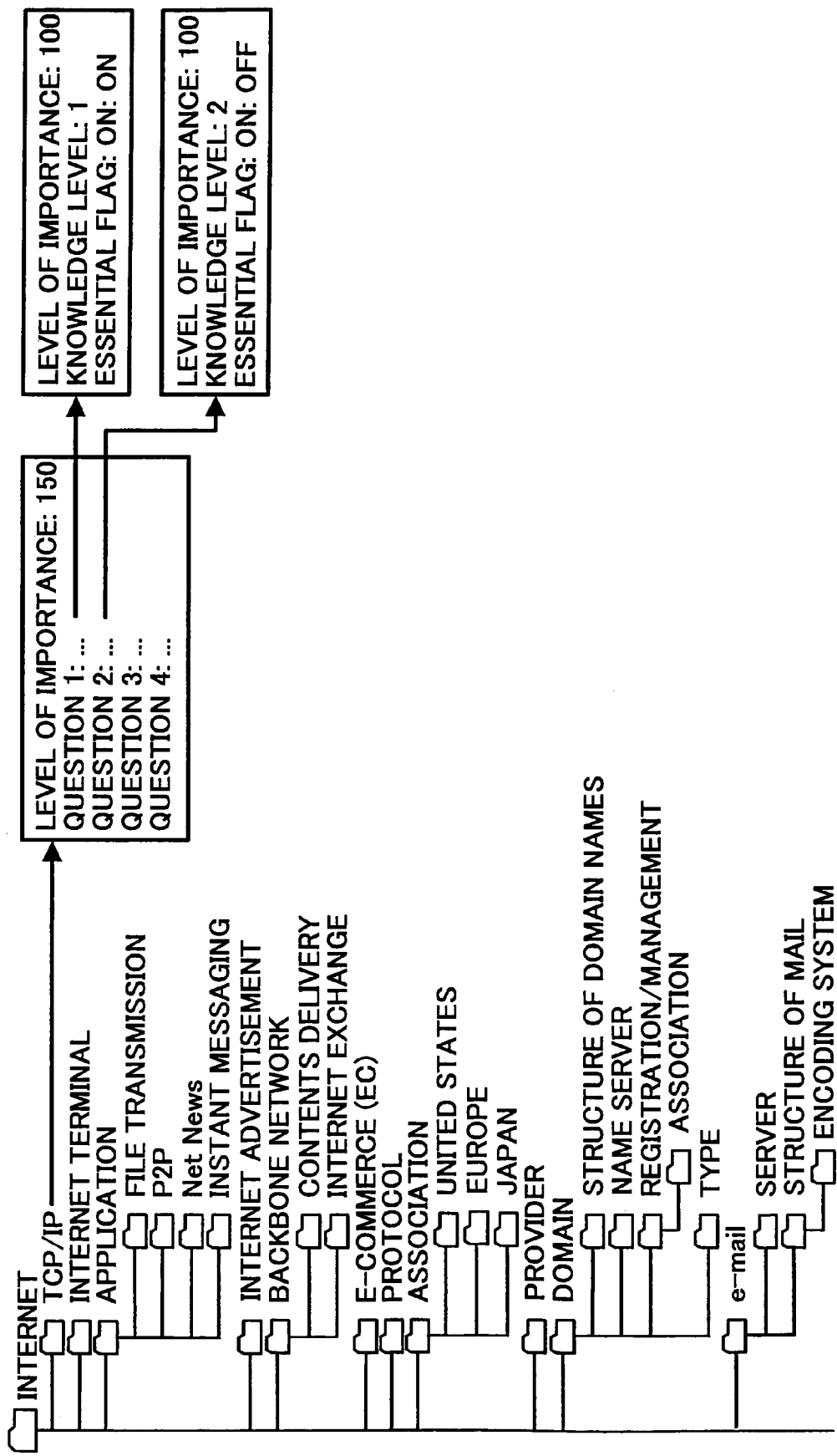
FIG. 7 is a schematic diagram for illustrating a relation between the education curriculum and a test.

FIG. 6 and FIG. 7 are schematic diagrams for illustrating relations between contents data 200, 250 and 260 and the education curriculum 400. The education curriculum is data for defining how to accumulate knowledge based on an education subject, and its data structure is predefined. The education curriculum in this embodiment includes a tree structure. The education curriculum 400 relating to the Internet shown in FIG. 6 has a three-hierarchy structure including a first hierarchy 410, a second hierarchy 420, and a third hierarchy 430.

In the present embodiment, all the contents 200, 250 and 260 are related with a learning item "Internet" A contents element 220c in the contents 200, a content element 250b in the contents 250, and a content element 260c in the contents 260 are related with, for example, TCP/IP in a lower hierarchy. The respective contents elements are related with the meta contents description information.

In such a manner, the respective contents and the respective contents elements composing the contents are related by a unidirectional or bidirectional link of the education curriculum in the e-learning so as to be managed. The education curriculum determining unit 120 can, therefore, determine the basic contents or the contents elements which should be included in the contents according to the education curriculum 400. The structure which defines such an education curriculum is prepared, so that maintenance such as addition, correction, and the like of a curriculum becomes easy.

The meta contents description information such as the level of importance is added to respective items of the education curriculum. A plurality of questions is added as a conformation examination to the respective items. Further, information such as knowledge levels, the level of importance, or whether an entrance examination is essential is defined in the respective questions.

Since the education curriculum is structured according to the learning level, contents are structured according to the education curriculum, so that difficulty of the learning contents can be gradually raised according to the level. The contents which are suitable for learning can be, therefore, restructured.

Figures 8, 9:
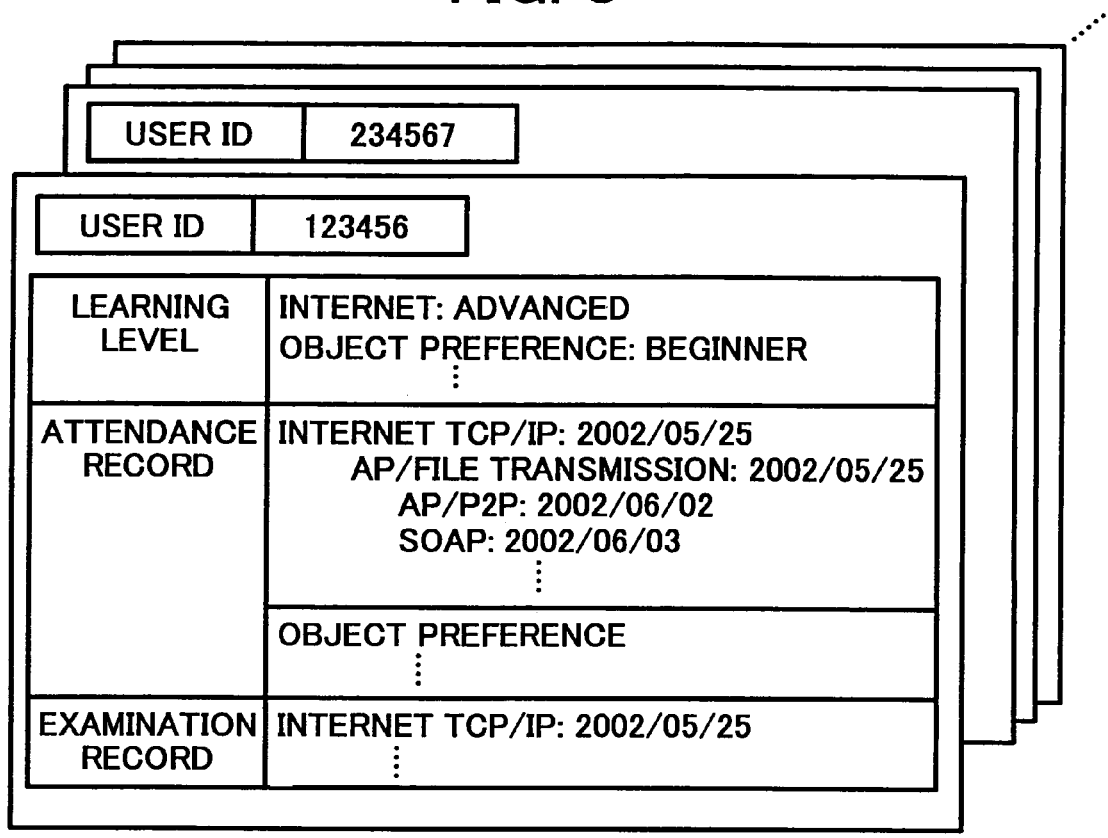
FIG. 8 is a schematic diagram of a data structure of user relevant information stored in a user DB.
FIG. 9 is a schematic diagram of a first input screen displayed on the display unit of the user terminal.

FIG. 8 is a schematic diagram of a data structure of user relevant information stored in a user DB 11. The user DB 11 stores the learning level, attendance records, examination records or the like of the tests related with the items, and the like therein as the user relevant information in a state that they are related with a user ID. The record of the lecture includes items which a user takes, dates on which the user takes the items, and the like.

The user DB 11 stores the information relating to the users therein. Therefore, when content elements which should be included in contents are determined based on the user relevant information stored in the user DB 11, teaching materials which are more suitable for the users can be restructured.

The user DB 11 may store information about items in which users are interested, personal information about users' fondness, users' occupations and users' ages as the user relevant information therein.

The contents restructuring process executed by the contents management system 1 is explained below. A user inputs a contents request on the display unit 22 of the user terminal 20. The contents request is, specifically, a theme or the like which the user desires to take. FIG. 9 and FIG. 10 are schematic diagrams of a first input screen 410 and a second input screen 420 displayed on the display unit 22, respectively.

The first input screen 410 includes input fields 411, 412, 413 and 414 for inputting user ID information, an item of an application for a lecture, a desired lecture, and a desired lecturer. The user can input desired items on these fields.

Disjunctive selection buttons 421 and 422 which indicate "Wish to acquire basic knowledge/Wish to acquire practical-type knowledge", and "Wish to spend a lot of time to learn/Wish to learn in a short time", are displayed on the second input screen 420. When the user wishes to specify a time, the user can specify a time directly on an input field 423. Selection buttons 424 and 425 which indicate "Inform me if new information is added", "Request the test" and the like are displayed. The user can click a button which is suitable for a user's request on this screen.

When the input from the user is completed on the display unit 22, information about the application for a lecture to be transmitted to the contents management apparatus 10 is generated based on the information input by the user on the first input screen 410 and the second input screen 420. The created information about the application for a lecture is transmitted to the contents management apparatus 10 via the network 30.

Figure 11A:
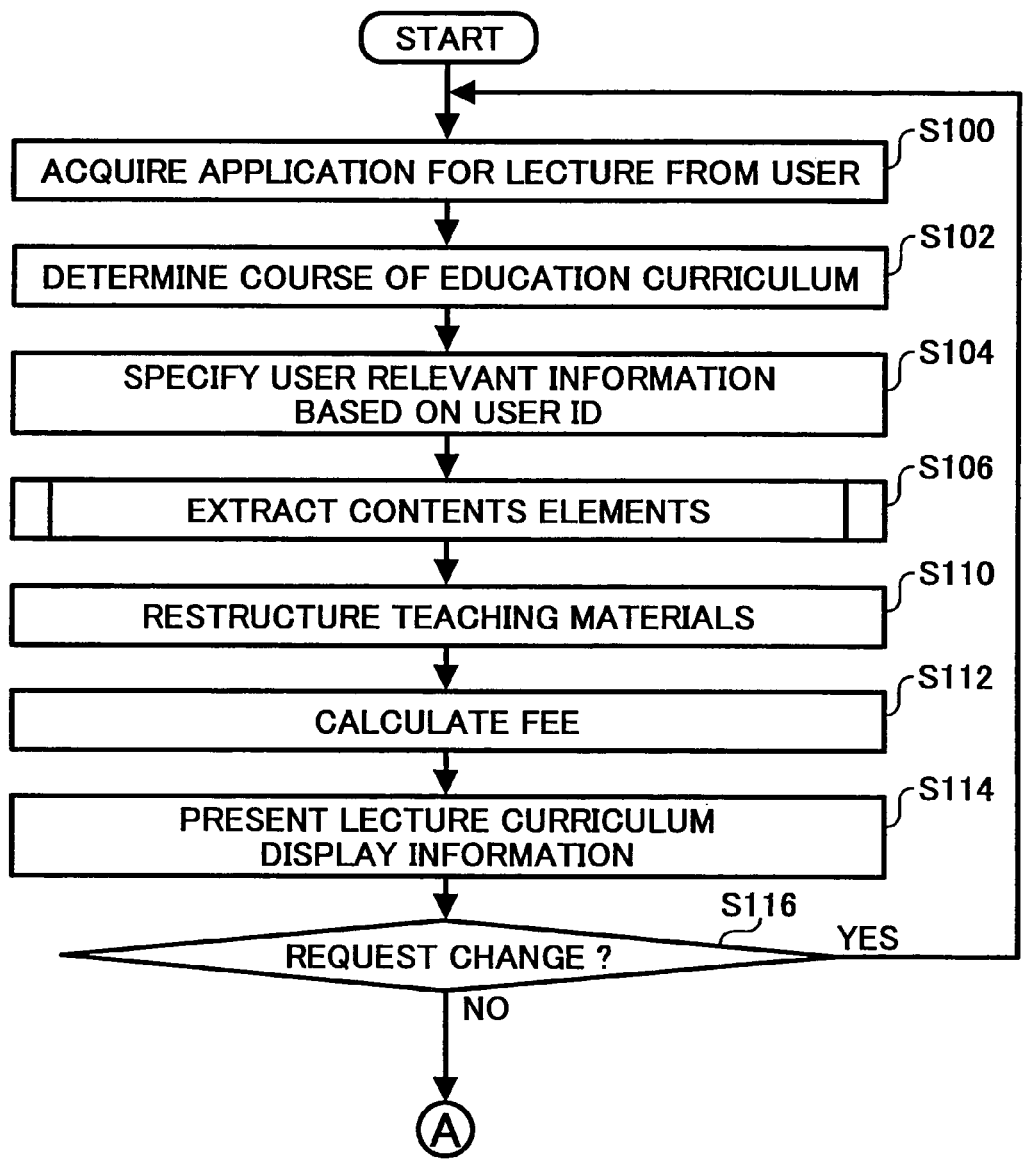
FIG. 11 is a flowchart of a process procedure in the contents management apparatus.
Figure 11B:
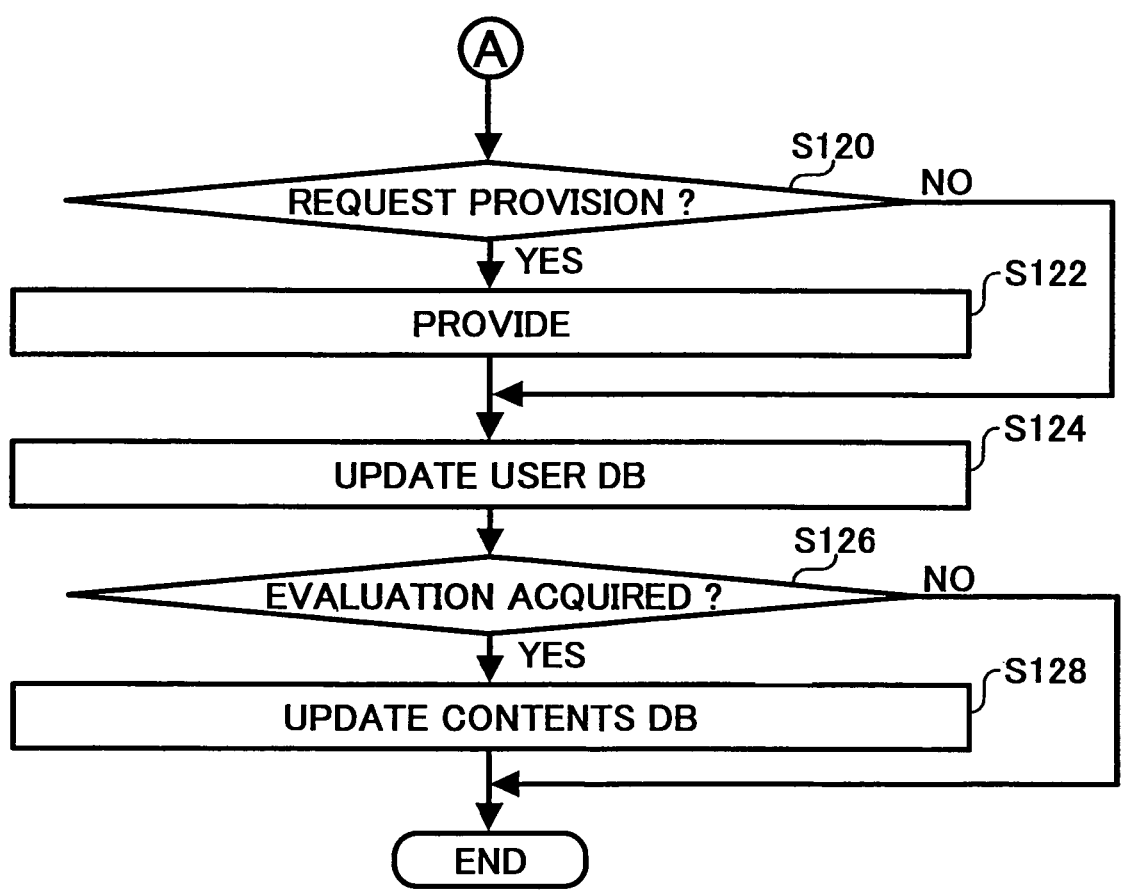

A process of the contents management apparatus 10 at the time when the contents management apparatus 10 receives the information about the application for a lecture from the user terminal 20 is explained below. FIG. 11 is a flowchart of a process procedure in the contents management apparatus 10.

When the acquiring unit 126 of the contents management apparatus 10 receives the application for a lecture (step S100), the acquiring unit 126 transmits the application for a lecture to the education curriculum determining unit 120 and the user relevant information specifying unit 122. The education curriculum determining unit 120 determines content elements to be included in the contents to be provided to the user and an order of the content elements, namely, a course of the learning (step S102) based on the education curriculum stored in the contents DB 12. In this case, it determines the shortest course led to a predetermined theme.

For example, when the contents about protocol are requested, the course of "TCP/IP", "Internet terminal", "application", "Internet advertisement", "backbone network", "e-commerce", and "protocol" in this order is determined along the tree structure shown in FIG. 6.

The user relevant information specifying unit 122 specifies the user relevant information related with the user ID shown on the application for lecture in the contents DB 12 (step S104). The contents element extracting unit 110 extracts contents elements to be included in the contents from the contents DB 12 based on the course of learning determined by the education curriculum determining unit 120 and the user relevant information specified by the user relevant information specifying unit 122 (step S106). At this time, the contents element extracting unit 110 extracts the contents elements from a plurality of contents. The teaching material restructuring unit 114 restructures the contents elements extracted by the contents element extracting unit 110 according to the course determined by the education curriculum determining unit 120 (step S110).

FIG. 12A and FIG. 12B are schematic diagrams of and example of the restructured contents. FIG. 12A depicts the contents restructured by the teaching material restructuring unit 114; and FIG. 12B depicts one portion of a record of attended lecture by the user. When the application for a lecture which requires a protocol is acquired, the course to the protocol is determined. However, this user has already attended "file transmission" and "P2P" which is on a lower hierarchy of "TCP/IP" and "application". Therefore, these content elements are removed from the content elements to be included in the restructured contents. Since the contents are restructured at the time when the application for a lecture is acquired, every time when the application for a lecture is acquired, the contents which are the most suitable for the user's request can be restructured at that time.

Referring back to FIG. 11, when the contents are created, the accounting unit 116 gathers the fee of the restructured contents based on the providing fees of the contents elements restructured by the teaching material restructuring unit 114 (step S112). The accounting unit 116, specifically, adds the fees of the content elements so as to determine the added fee as the restructured contents fee.

The teaching material presenting unit 118 creates lecture curriculum display information representing a program and a fee of the contents restructured by the teaching material restructuring unit 114. It transmits the created lecture curriculum display information to the user terminal 20 (step S114). At this time, the received lecture curriculum display information is displayed on the display unit 22.

FIG. 13 is a schematic diagram of lecture curriculum display information 450 displayed on the display unit 22 at step S114 in FIG. 11. The lecture curriculum 450, namely, the names of the content elements included in the contents is displayed in a structured order on the screen of lecture curriculum display information 450. The playing times of the contents are displayed. The user can check contents of the lecture curriculum on this screen.

When a change is requested, an selection button 452 representing "request a change" included in the lecture curriculum display information 450 is selected, so that contents of the lecture curriculum can be changed. A "define" button 454 and a "fee information" button 456 are displayed on the screen of the lecture curriculum display information 450.

When the user selects the "define" button 454, the contents management apparatus 10 receives a providing request representing a request for the contents of the lecture curriculum from the user terminal 20. The process for providing the contents to the user is executed continuously. When the "fee information" button 456 is selected, the contents providing fee of the lecture curriculum is displayed on the display unit 22.

Referring back to FIG. 11, the lecture curriculum display information is displayed on the display unit 22 at step S114, and when the change request representing a change of the lecture contents is received from the user (Yes at step S116), the sequence returns to step S100. Contents elements to be extracted are again determined based on the user's request.

On the contrary, when a request for provision of the contents on the lecture curriculum displayed on the display unit 22 at step S144 is received from the user (Yes at step S120), the teaching material presenting unit 118 provides the contents corresponding to the lecture curriculum to the user via the network 30 (step S122). In this case, the user DB 11 updates the user relevant information about the user as a providing destination. Specifically, the contents elements provided this time is added to the record of attended lecture (step S124).

FIG. 14 is a schematic diagram of updated user relevant information. Since the user relevant information in the user DB 11 is updated every time when the contents are provided to the user in such a manner, the contents element extracting unit 110 can always determine contents elements to be extracted based on the latest user relevant information.

After step S124 in FIG. 11, when an evaluation about the provided contents are received from the user (step S126), the updating unit 124 reflects the evaluation on the popularity ratings of the corresponding contents elements (step S128). Specifically, when, for example, the evaluation is good, a value of the popularity rating is increased. When the information from the user is fed back to a selecting condition of the contents elements, contents elements whose popularity ratings are high can be provided to the user. The process of the contents management apparatus 10 is ended.

FIG. 15 is a schematic diagram of an evaluation input screen 460 for inputting evaluations of course contents taken. The evaluation input screen 460 is provided with evaluation input fields for respective contents elements. The user watches the provided teaching materials on this screen, and can input feedback information such as "The contents are satisfactory" and "Request watching other contents". The display unit 22 creates evaluation information based on the information input by the user on this screen and transmits the evaluation information to the contents management apparatus 10 via the network 30.

When the acquiring unit 126 of the contents management apparatus 10 receives the evaluation information, the updating unit 124 updates the popularity ratings of the corresponding contents elements in the contents DB 12 based on he evaluation information. When the contents management apparatus 10 further receives, for example, a request representing "Request watching other contents", the contents management apparatus 10 restructures contents including contents elements other than the contents elements provided this time so as to provide them to the user.

As the evaluation information, information about, for example, "Request watching other contents because the contents are hard to understand" may be acquired.

As a result, a user's satisfaction level can be obtained as the meta contents description information of the contents. Since other contents including contents elements other than the contents elements provided this time can be provided to a user who requests provision of other contents elements, teaching materials, namely, the contents which meet the user's request can be provided.

In the present embodiment, at the time when the application for lecture is acquired from the user, contents which meet the user's request are restructured so as to be provided to the user. As another example, however, the user occasionally makes a request for "Request acquiring new contents elements when they are added" or a request for, in the same theme, "Request acquiring contents elements when they are updated". In such cases, the user clicks an item corresponding to the request on the input screen shown in FIG. 10, so that the information representing this is transmitted to the contents management apparatus 10. The contents management apparatus 10 provides target contents elements to the user based on the received information every time when new contents elements are added or target contents elements are updated.

Figure 16:
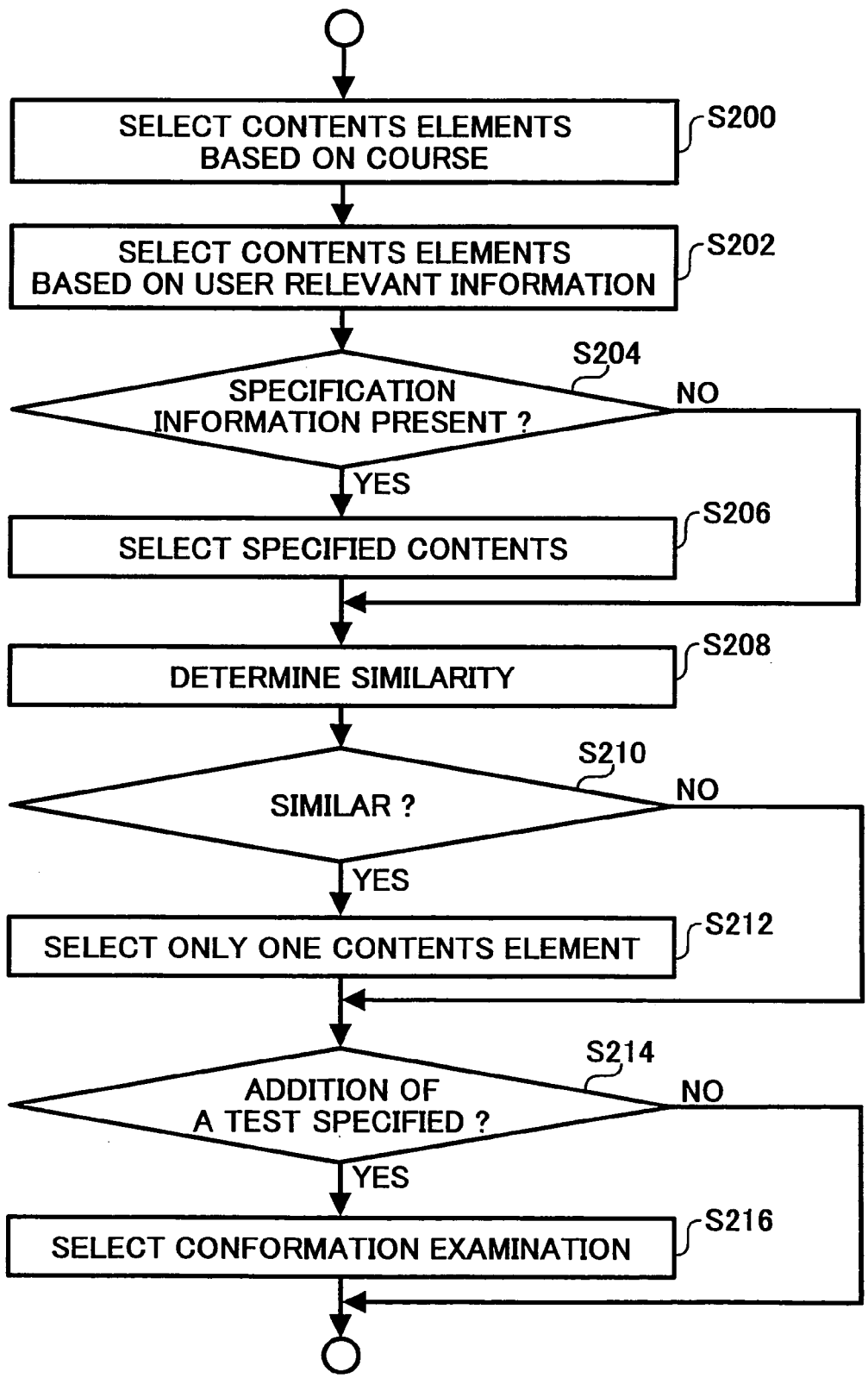
FIG. 16 is a flowchart of a detailed process of the contents management apparatus at step S106 in FIG. 11.

The detailed process of the contents management apparatus 10 at step S106 in FIG. 11 is explained below with reference to FIG. 16.

The contents element extracting unit 110 specifies contents elements corresponding to the course determined by the education curriculum determining unit 120 (step S200). The user relevant information specifying unit 122 specifies contents elements which should be removed from the previously determined contents elements based on the specified user relevant information (step S202). Specifically, the contents to be removed are specified based on the meta contents description information related with the contents elements specified at step S200 and the user relevant information.

When, for example, a learning level of the user is a beginner, contents elements other than the contents elements for the beginner are removed. The contents elements whose essential flag is ON are not, however, removed. When predetermined contents elements are specified on the decision of the course, their essential flags are ON, and the meta contents description information including the essential flag ON are related with a plurality of contents elements in one to plural relationship, all the contents elements are included in the contents to be restructured. As a result, all the contents elements specified as being essential can be included in the contents to be restructured.

The record of attended lecture stored as the user relevant information is referred to, and contents elements which have been already provided to the user are removed. Even if the user has been already lectured about the contents elements, when these contents elements are updated after the providing date, the updated information is not provided to the user. In this case, therefore, the contents elements are not removed.

When, for example, the course determined by the education curriculum determining unit 12 includes "TCP/IP" as the contents element, a determination is made whether "TCP/IP" is related with the user ID as the provided contents element in the contents DB 12. When "TCP/IP" is related with the user ID, the providing date is referred to in the contents DB 12. When the providing date of "TCP/IP" is a date before the updating date related with "TCP/IP" as the contents element relevant information, the contents element "TCP/IP" is again extracted in order to provide the updated content to the user.

When information for directly specifying contents elements is acquired from the user (YES at step S204), the contents element extracting unit 110 extracts the contents elements, which are determined according to the course determined by the education curriculum determining unit 120, and the contents elements, which are determined based on the user relevant information specified by the user relevant information specifying unit 122, as contents elements to be included in the contents (step S206). When the contents element extracting unit 110 extracts all the contents elements to be included in the contents, the similarity determining unit 112 determines similarity between the extracted contents elements (step S208).

When the similarity determining unit 112 determines that the similarity between two or more contents elements is high (Yes at step S210), only one of the contents elements is included in the contents (step S212). The determination of the similarity may be made by image matching of still image data in the respective contents elements.

At this time, a determination is made arbitrarily which contents element is included in the contents. For example, the content element of the two contents elements having high popularity rating may be included in the contents, or alternatively, the contents element having high level of importance may be included in the contents. Further, the contents element may be included in the contents according to the playing time. Specifically, when the user desires to learn as quickly as possible, a content element with a short playing time may be included in the contents.

When the request for tests is acquired from the user (Yes at step S214), the conformation examinations which are related with the contents elements, respectively are extracted (step S216).

At this time, questions which are included in the conformation examinations are determined based on the information about user's application for lecture and user's examination records. For example, levels of the questions are determined based on the learning levels. Since the tests are restructured based on user's learning levels, knowledge necessary for the user can be checked.

In another example, a desired achievement level is pre-stored as the user relevant information, and the test may be restructured based on the desired achievement level.

When "essential" is set in attributes of the respective questions, questions are restructured without omitting these questions. Questions which have been tried in the past are removed from the test.

Figure 17:
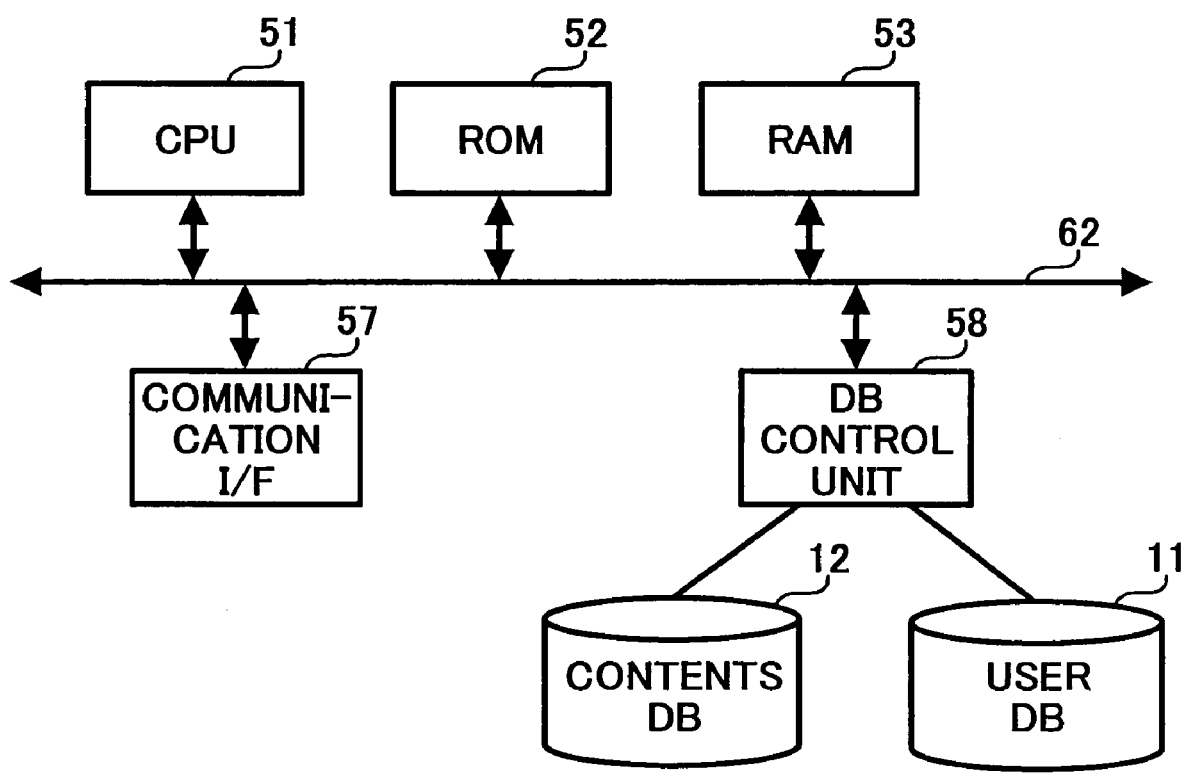
FIG. 17 is a schematic diagram of a hardware configuration of the contents management apparatus according to the first embodiment.

FIG. 17 is a schematic diagram of a hardware configuration of the contents management apparatus 10 according to the first embodiment. The contents management apparatus 10 has a read only memory (ROM) 52, a central processing unit (CPU) 51, a random access memory (RAM) 53, a communication interface (I/F) 57, a bus 62, a DB control unit 58. The contents management program or the like in the contents management apparatus 10 explained in FIG. 3 is stored in the ROM 52. The CPU 51 controls respective units of the contents management apparatus 10 according to the programs in the ROM 52, and executes the contents management process or the like. A work area is formed, and various data which are necessary for controlling the contents management apparatus 10 are stored in the RAM 53. The communication I/F 57 is connected with the network so as to make a communication. The bus 62 connects the respective units. The DB control unit 58 controls the databases 11 and 12.

The contents management program which executes the contents management process in the contents management apparatus 10 is recorded in a recording medium such as a CD-ROM, a floppy disc (FD), or a digital versatile disk (DVD) that is readable by a computer into an installable or executable file format. The program is provided in such a format.

A fault monitoring program in this embodiment may be stored in the computer connected with the network such as the Internet, and may be downloaded via the network so as to be provided.

The fault monitoring program in this embodiment is loaded onto a main storage device by reading the program from the recording medium in a complex machine 1 and executing it. The respective units explained in the software constitution are formed on the main storage device.

Figure 18:
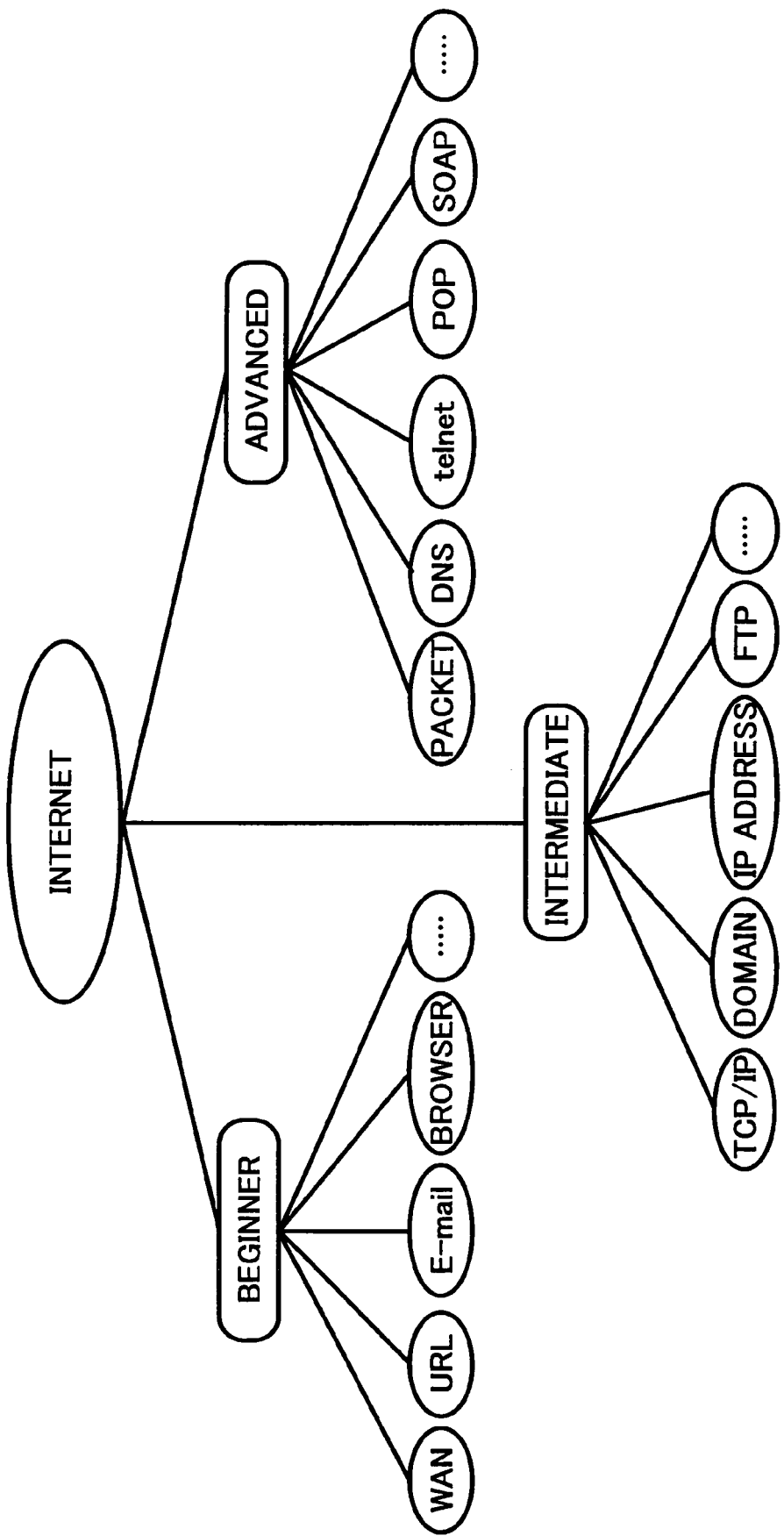
FIG. 18 is a schematic diagram of a data structure of the education curriculum according to another example.

The contents management system 1 according to the first embodiment is explained above, but the embodiment can be variously modified or improved. FIG. 18 is a schematic diagram of a data structure of the education curriculum according to another example. The curriculums of contents elements in this example are structured by a tree structure similarly to the data of the education curriculum explained in the first embodiment. The curriculum in this example is, however, different from that in the first embodiment in that the curriculums are classified based on learning levels. When the curriculums are structured based on the learning levels, the contents can be easily restructured according to the levels.

FIG. 19 is a schematic diagram of a contents management system 1 according to a second embodiment of the present invention. The contents management system 1 according to the second embodiment includes the contents management apparatus 10 having the contents DB 12, a contents providing apparatus 40, and the user terminals 20a and 20b. The contents providing apparatus 40 can communicate with the contents management apparatus 10 via a first network 30, and has the user DB 11. The user terminals 20a and 20b can communicate with the contents providing apparatus 40 via a second network 50.

In the second embodiment, the contents providing apparatus 40 has the function of the processing unit 100 explained with reference to FIG. 3 in the first embodiment, and the contents management apparatus 10 does not have the function of the processing unit. Namely, the processing unit 100 is included in the contents providing apparatus 40 instead of the contents management apparatus 10. In this point, the contents management system 1 according to the second embodiment is different from the contents management system 1 according to the first embodiment in which the contents management apparatus 10 has the processing unit 100.

More specifically, the first network 30 may be the Internet, and the second network 50 may be an inter-office LAN, for example.

Since the contents management apparatus 10 in the contents management system 1 according to the second embodiment does not have the processing unit 100, it manages only contents stored in the contents DB 12. The contents providing apparatus 40 executes a process such as restructure of contents, and provides the restructured contents to the user terminal 20.

Further, in the contents management system 1 according to the second embodiment, since the contents providing apparatus 40 has the user DB 11, the contents providing apparatus 40 extracts the contents elements based on the user relevant information stored in the user DB 11. When the user DB 11 is provided to the contents management apparatus 10, the contents providing apparatus 40 should acquire the user relevant information via the first network 30. Therefore, when the first network 30 is a public line, the user relevant information possibly leaks to the outside. According to the second embodiment, however, since it is not necessary to transmit and receive the user relevant information via the first network 30, the information is no danger of leaking.

Figure 20B:
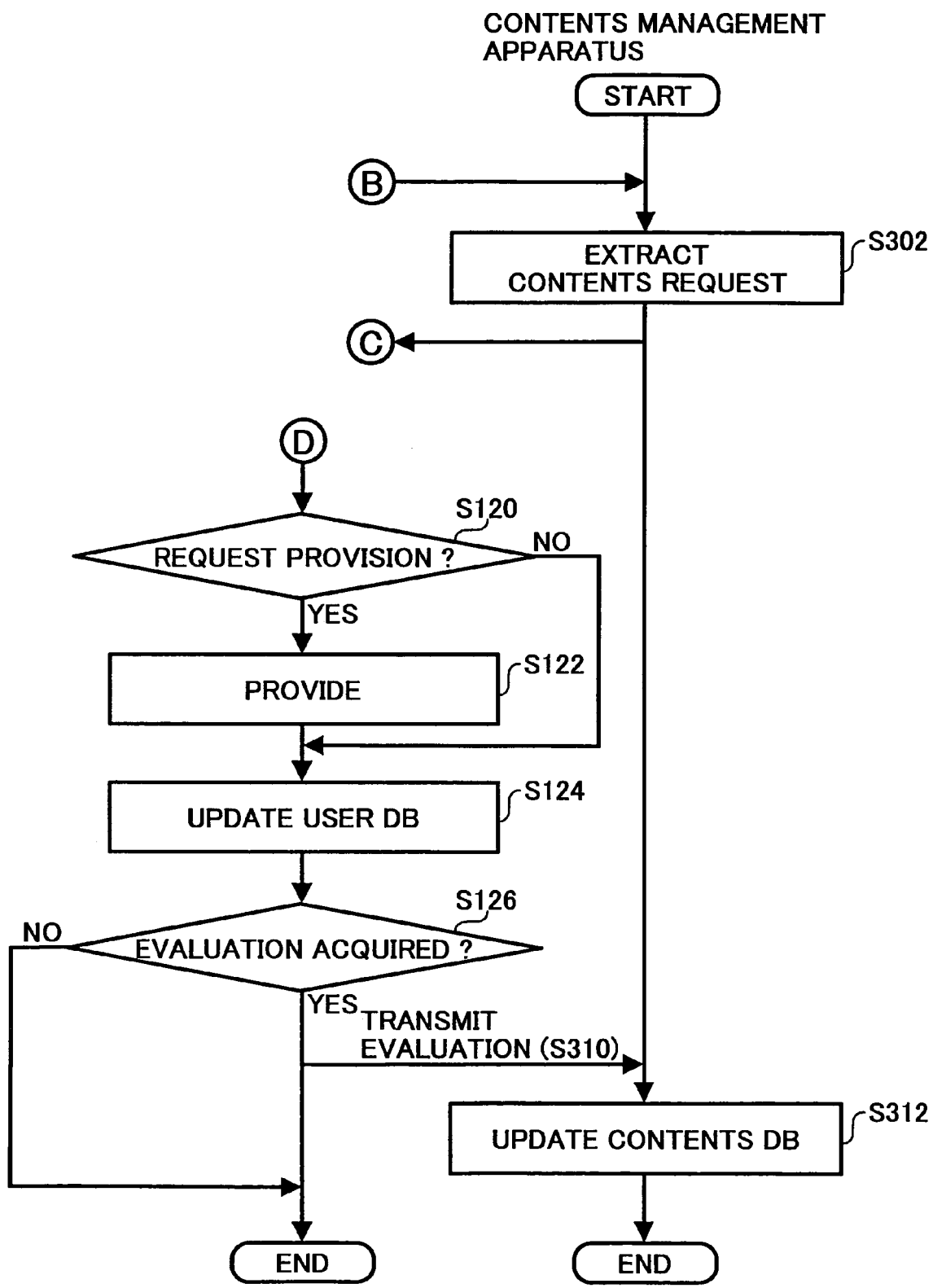
FIG. 20 is a flowchart of a process procedure when the management system 1 provides contents to a user according to the second embodiment.

The process when the contents management system 1 according to the second embodiment provides contents to the user is explained below with reference to FIG. 20. The steps shown in FIG. 20, which are designated by like reference numerals as those of the steps explained in the first embodiment with reference to FIG. 11, are the same as the steps in the processing unit 100 according to the first embodiment. Therefore, the explanation thereof is omitted.

When the course of an education curriculum is determined at step S104, the sequence goes to step S106 so that content elements are determined. At the step S106 in this embodiment, only conditions of the content elements to be included in the content to be restructured are determined differently from step S106 in the first embodiment, and thus the determined content elements are not extracted. When the contents providing apparatus 40 determines the content elements to be included in the contents to be provided to the user at step S300, it requests the determined contents elements from the contents management apparatus 10 via the network 30 (step S300).

When the contents management apparatus 10 receives the request for the content elements, it extract the specified content elements from the contents DB 12 (step S302). The contents management apparatus 10 transmits the extracted content elements to the contents providing apparatus 40 via the network 30 (step S304). When the contents providing apparatus 40 receives the content elements from the contents management apparatus 10, it restructures the received contents elements so as to provide the content elements to be provided to the user.

When the contents providing apparatus 10 acquires evaluation information about the provided contents from the user (step S126), it transmits the evaluation information to the contents providing apparatus 40 (step S310). When the contents management apparatus 10 receives the evaluation information, it updates the contents DB 1211 based on the evaluation information (step S312).

Figure 21:
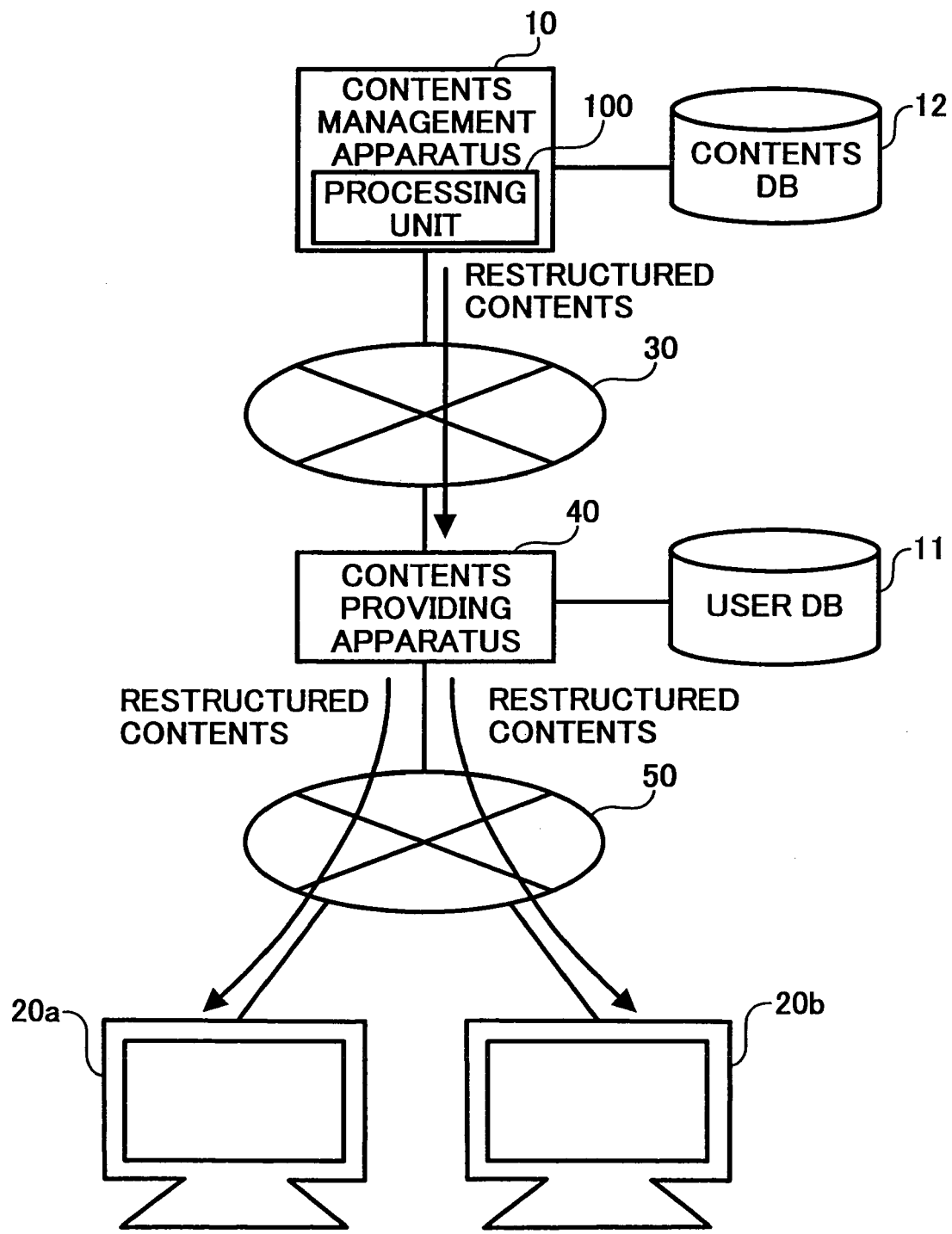
FIG. 21 is a schematic diagram of a contents management system according to a third embodiment of the present invention.

The contents management system 1 according to the third embodiment is explained below. FIG. 21 is a schematic diagram of a contents management system 1 according to a third embodiment of the present invention. The entire constitution of the contents management system 1 according to the third embodiment is similar to the entire constitution of the contents management system 1 according to the second embodiment. In the third embodiment, however, the contents management apparatus 10 has a function other than the user relevant information specifying unit 122 in the processing unit 100. The contents providing apparatus 40 has only the function of the user relevant information specifying unit 122 in the functions of the processing unit 100. In this point, the contents management system 1 according to the third embodiment is different from the contents management system 1 according to the second embodiment in which the contents providing apparatus 40 has the function of the processing unit 100.

Since the contents management apparatus 40 has the user DB 11, an administrator of the contents providing apparatus 40 can update the contents of the user DB 11 properly.

FIG. 22 is a flowchart of a process procedure when the contents management system 1 provides contents to a user according to the third embodiment. The steps shown in FIG. 22, which are designated by like reference numerals as those explained with reference to FIG. 11 in the first embodiment, are similar to the steps in the processing unit 100 in the first embodiment 1.

The application for lecture is transmitted from the user to the contents providing apparatus 40 via the second network

50. When the contents providing apparatus 40 receives the application for lecture (step S100), it transmits the application for lecture to the contents management apparatus 10 via the first network 30 (step S400).

The contents providing apparatus 40 specifies the user relevant information from the user DB 11 based on the user ID included in the application for lecture (step S104). The contents providing apparatus 40 transmits the specified user relevant information to the contents management apparatus 10 (step S402).

The contents management apparatus 10 specifies content elements based on the received application for lecture and the user relevant information, and restructures contents from the specified content elements (steps S102 to S112). The contents management apparatus 10 transmits the created lecture curriculum display information to the contents providing apparatus 40 (step S410).

When the contents providing apparatus 40 receives a request for provision of the contents from the user (Yes at step S120), it transmits the request to the contents management apparatus 10 (step S420). The contents providing apparatus 40 receives the specified contents, namely, the contents included in the lecture curriculum (step S422). The contents providing apparatus 40 provides the received contents to the user (step S122).

As explained in the first to the third embodiments, the constitution of the contents management system 1 has a high degree of freedom, and the system is not limited to the embodiments.

Figure 23:
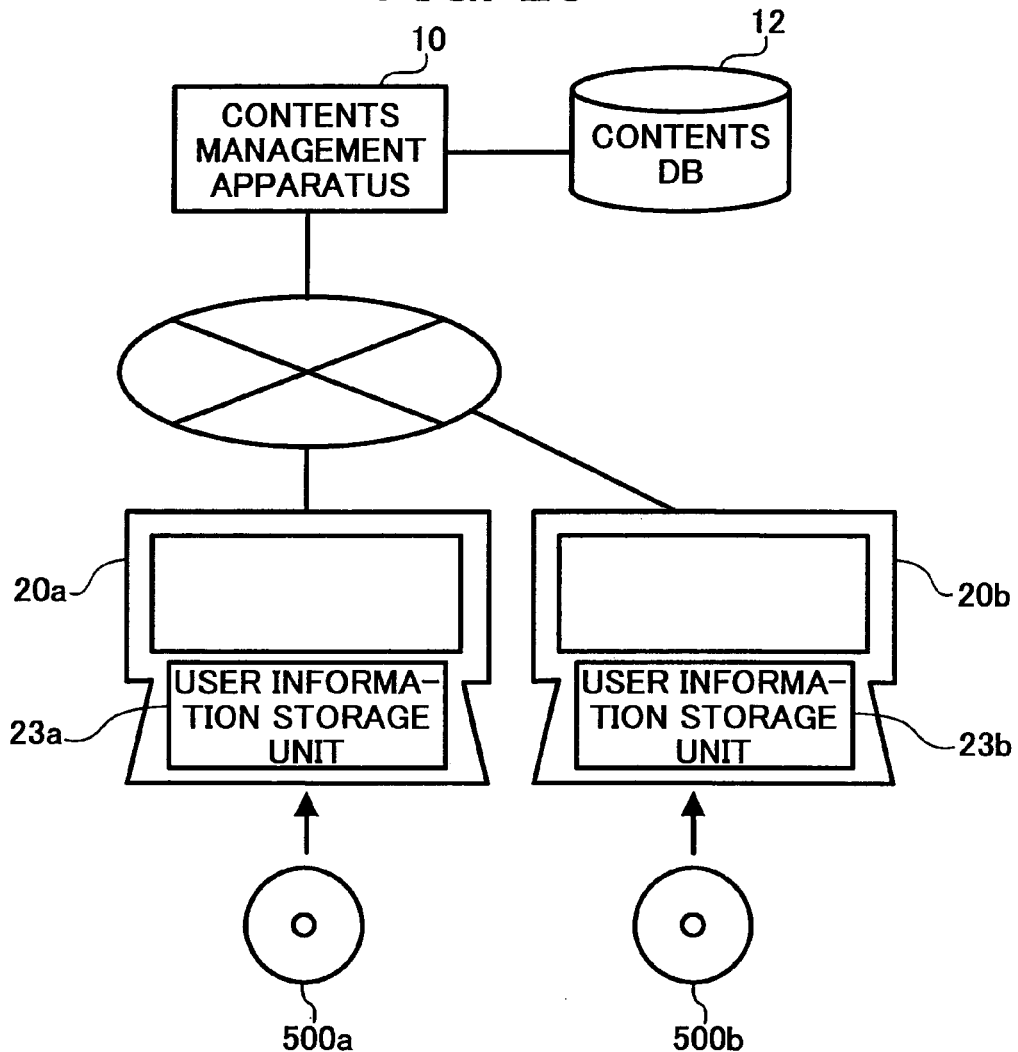
FIG. 23 is a schematic diagram of a contents management system according to a fourth embodiment of the present invention.

FIG. 23 is a schematic diagram of a contents management system 1 according to a fourth embodiment of the present invention. The entire constitution of the contents management system 1 according to the fourth embodiment is similar to that of the contents management system 1 according to the first embodiment. In the fourth embodiment, however, the function of the processing unit 100 in the contents management apparatus 10 according to the first embodiment is provided to the user terminal 20. In this point, the contents management system 1 in this embodiment is different from the contents management system 1 according to the first embodiment. The contents management system 1 according to the fourth embodiment 4 includes the contents management apparatus 10 having the contents DB 12, and the user terminals 20*a* and 20*b* which can communicate with the contents management apparatus 10 via the first network.

The function of the processing unit 100 in the fourth embodiment is, for example, provided by a detachable recording medium 500 which stores the contents management program for realizing the function of the processing unit 100 therein. Namely, the contents management program stored in the recording medium 500 is installed into the user terminal 20. The recording medium 500 can be, for example, a CD-ROM or a DVD.

In the fourth embodiment, the user terminal 20 has a user relevant information storage unit 23. The user relevant information storage unit 23 stores the user relevant information about a user utilizing the user terminal 20. When the user terminal 20 is utilized by a plurality of users, the user relevant information about the respective users are related with user IDs, respectively, so as to be stored.

The process in the processing unit 100 of the user terminal 20 in this embodiment is approximately similar to the process in the contents management apparatus 10 explained in the first embodiment. In the fourth embodiment, the user terminal 20 acquires contents elements via the network 30. The user terminal 20 determines contents elements based on the user relevant information stored in the user relevant information storage unit 23 instead of the user DB 11.

Figure 24:
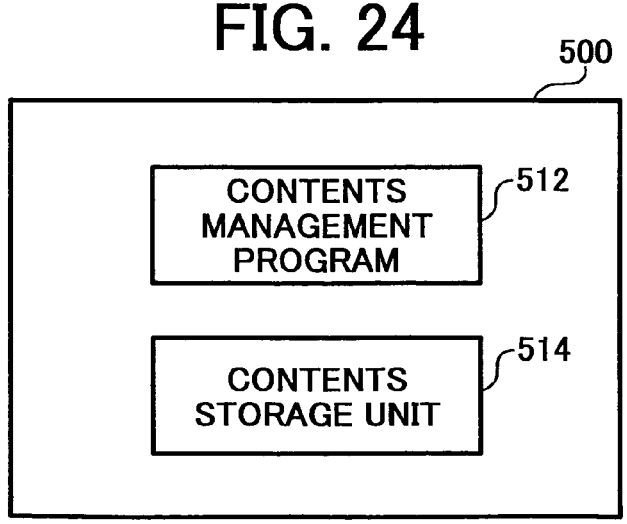
FIG. 24 is a schematic diagram of a recording medium according to a fifth embodiment of the present invention.

FIG. 24 is a schematic diagram of a recording medium according to a fifth embodiment of the present invention. The contents management system 1 according to the fifth embodiment is realized in the user terminal 20 explained in the fourth embodiment. In the fifth embodiment, however, the recording medium 500 which should be installed to the user terminal has a contents storage unit 514 which stores contents as well as the contents management program 512. Namely, the user terminal 20 in the fifth embodiment extracts contents elements from the contents stored in the recording medium 500. In this point, the user terminal 20 according to the fifth embodiment is different from the user terminal 20 in the fourth embodiment 4 which acquires content elements via the network 30.

As explained above, according to the first aspect of the invention, new contents are restructured from contents elements extracted based on the contents request information. Therefore, the contents including only the contents elements necessary for a user can be restructured. Contents which meet a user's request can be, therefore, provided to the user. Since a data amount of contents can be suppressed as small as possible, the contents can be provided efficiently.

The contents elements are extracted first at the time when the request for the contents is acquired, so that the contents are restructured. Therefore, even when the contents elements are updated, the contents including the updated contents elements can be always restructured.

According to the second aspect of the invention, since the contents restructuring unit can create a large variety of contents, contents which meet a user's request can be restructured.

Further, according to the third aspect of the invention, since the contents storage unit that stores a plurality of contents is provided, the contents restructuring unit can restructure contents using the contents stored in the contents storage unit.

According to the fourth aspect of the invention, a determination can be made whether contents elements are extracted based on contents element information related with the contents elements. Therefore, the contents elements can be extracted automatically and efficiently.

According to the fifth aspect of the invention, the contents element extracting unit can extract contents based on genres of contents elements, it can extract the contents elements which belong to the genres meeting a user's request can be extracted. The contents which meet the user's request can be, therefore, restructured.

According to the sixth aspect of the invention, the contents element extracting unit can extract contents elements based on a level of importance of the contents elements. Therefore, the contents including only the important contents elements can be restructured according to the user's request.

According to the seventh aspect of the invention, since the contents element extracting unit can extract contents elements based on a popularity rating of the content elements, it can extract the contents elements which are popular among users. The contents restructuring unit can restructure contents including the contents elements having high popularity rating.

According to the eighth aspect of the invention, since the contents element extracting unit can extract contents elements based on a popularity rating of a lecturer, it can extract the contents elements lectured by popular lecturers. Therefore, the contents restructuring unit can restructure contents including the contents elements lectured by the popular lecturers.

According to the ninth aspect of the invention, the contents element extracting unit determines contents elements to be extracted based on the user relevant information about a user to whom contents should be provided. Therefore, the contents element extracting unit can extract the contents elements which meet a user's request.

According to the tenth aspect of the invention, when contents relating to learning are provided to a user, the contents element extracting unit can extract contents elements according to a user's learning level.

According to the eleventh aspect of the invention, the contents element extracting unit extracts contents elements, which have been already provided to a user, so as to provide them to the user only when the contents elements are updated after the providing date. Therefore, the contents element extracting unit does not provide contents including the same contents elements to the user. In such a manner, contents can be provided efficiently.

According to the twelfth aspect of the invention, the contents element extracting unit extracts contents elements other than contents elements which have been already provided to a user. Therefore, contents can be provided efficiently.

According to the thirteenth aspect of the invention, evaluations can be fed back from a user, to whom contents are provided, to the respective contents elements. Therefore, the evaluations from users are reflected on contents elements, and the contents elements which meet the user's request are extracted so as to be provided to the user.

According to the fourteenth aspect of the invention, the contents element extracting unit can extract contents elements which are more suitable for a user's request based on the user relevant information stored in the user information storage unit.

According to the fifteenth aspect of the invention, the contents element extracting unit can extract contents elements based on an updating date of the contents elements. Namely, only when contents elements are updated comparatively recently, the contents element extracting unit can provide the contents elements to a user. Therefore, this unit can provide the latest contents elements to the user.

According to the sixteenth aspect of the invention, the contents element extracting unit can extract contents elements based on a creating date of the contents elements. Namely, only when contents elements are created comparatively recently, the contents element extracting unit can provide the contents elements to a user. Therefore, this unit can provide the latest contents elements to the user.

According to the seventeenth aspect of the invention, when a total playing time of contents to be provided to a user is predetermined, the contents element extracting unit can determine contents elements to be extracted based on the playing time of the contents elements and a total playing time of the contents to be restructured. Therefore, the contents elements to be extracted can be determined so that the contents elements which meet a user's request are included within the predetermined time in just proportion.

According to the eighteenth aspect of the invention, the contents element extracting unit can extract contents elements represented by specifying information acquired by a specification acquiring unit. Therefore, contents which include the contents elements according to a user's request can be restructured.

According to the nineteenth aspect of the invention, since a contents restructuring unit restructures contents elements based on a predetermined structuring order, it can restructure contents elements automatically in a preferable structuring order.

According to the twentieth aspect of the invention, the contents restructuring unit restructures contents elements extracted by the contents element extracting unit in an order of learning levels. Therefore, a user may browse the contents elements according to the order. In such a manner, convenient contents can be restructured.

According to the twenty-first aspect of the invention, when a determination is made that two contents elements are similar, the contents restructuring unit makes new contents include only one of the two contents elements. Therefore, lengthy contents including overlapped contents can be avoided from being provided to a user. The user can, therefore, acquire only necessary information efficiently.

According to the twenty-second aspect of the invention, since contents elements are related with accounting information, a fee of contents restructured by the contents structuring unit can be determined easily based on respective pieces of the accounting information. The fee can be determined efficiently.

According to the twenty-third aspect of the invention, since contents include lecture content information and meta contents description information. Therefore, the contents element extracting unit utilizes these pieces of the information effectively so as to be capable of extracting contents elements efficiently.

According to the twenty-fourth aspect of the invention, since a data mount of contents can be suppressed as small as possible, contents can be provided efficiently. Contents elements are extracted first at the time when a contents request is acquired, and contents are restructured. Therefore, even when the contents elements are updated, the contents which include the updated contents elements can be always restructured.

According to the twenty-fifth aspect of the invention, the contents element extracting unit can extract contents elements which meet a user's request more suitably based on the user relevant information stored in the user information storage unit.

According to the twenty-sixth aspect of the invention, since a data amount of contents can be suppressed minimally, contents can be provided efficiently. Contents elements are extracted first at the time when a contents request is acquired, and contents are restructured. Therefore, even when the contents elements are updated, the contents which include the updated contents elements can be always restructured.

According to the twenty-seventh aspect of the invention, since a data amount of contents can be suppressed minimally, contents can be provided efficiently. Contents elements are extracted first at the time when a contents request is acquired, and contents are restructured. Therefore, even when the contents elements are updated, the contents which include the updated contents elements can be always restructured.

According to the twenty-eighth aspect of the invention, since a data amount of contents can be suppressed minimally, contents can be provided efficiently. Contents elements are extracted first at the time when a contents request is acquired, and contents are restructured. Therefore, even when the contents elements are updated, the contents which include the updated contents elements can be always restructured.

According to the twenty-ninth aspect of the invention, since a data amount of contents can be suppressed minimally, contents can be provided efficiently. Contents elements are extracted first at the time when a contents request is acquired, and contents are restructured. Therefore, even when the contents elements are updated, the contents which include the updated contents elements can be always restructured.

According to the thirtieth aspect of the invention, contents data include lecture content information and meta contents description information. Therefore, contents elements are extracted efficiently by utilizing these information, and new contents can be restructured from the extracted contents elements.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A contents management apparatus that manages contents including a plurality of contents elements representing information to be provided to a user, comprising:
   a contents request acquiring unit that acquires contents request information from the user;
   a contents element extracting unit that extracts the contents elements based on the contents request information when the contents request acquiring unit acquires the contents request information from the user;
   a contents restructuring unit that restructures new contents from the contents elements extracted; and
   a contents storage unit that stores the contents,
   wherein the contents element extracting unit extracts the contents elements from the contents stored in the contents storage unit,
   the contents elements include information on lecturers,
   the contents storage unit stores the contents elements in association with popularity of the lecturers, and
   the contents element extracting unit extracts the contents elements based on the popularity.

2. The contents management apparatus according to claim 1, wherein
   the contents storage unit also stores the contents elements in association with contents relevant information that is related to the contents elements, and
   the contents element extracting unit alternatively extracts the contents elements based on the contents relevant information.

3. The contents management apparatus according to claim 1, wherein
   the contents storage unit also stores the contents elements in association with a genre of the contents elements, and
   the contents element extracting unit alternatively extracts the contents elements based on the genres.

4. The contents management apparatus according to claim 1, wherein
   the contents storage unit also stores the contents elements in association with a level of importance of the contents elements, and
   the contents element extracting unit alternatively extracts the contents elements based on the level of importance.

5. The contents management apparatus according to claim 1, wherein
   the contents storage unit also stores the contents elements in association with a popularity of the contents elements, and
   the contents element extracting unit alternatively extracts the contents element based on the popularity.

6. The contents management apparatus according to claim 1, further comprising a user information acquiring unit that acquires user identification information for identifying the user to be provided with the contents, wherein
   the contents element extracting unit alternatively extracts the contents elements based on user relevant information that is related to the user identification information acquired.

7. The contents management apparatus according to claim 6, wherein the contents element extracting unit extracts the contents elements based on a learning level of the user corresponding to the user identification information.

8. The contents management apparatus according to claim 7, wherein
   the contents storage unit stores the contents elements in association with an updating date of the contents elements, and
   the contents element extracting unit extracts, based on the contents elements and a providing date recorded in the user identification information as previously provided, the contents elements corresponding to the updating date after the providing date.

9. The contents management apparatus according to claim 6, further comprising a user information storage unit that stores the user identification information and the user relevant information corresponding to each other.

10. The contents management apparatus according to claim 1, further comprising:
    a contents providing unit that provides the contents to the user;
    an evaluation acquiring unit that acquires an evaluation of the contents elements included in the contents provided from the user who used the contents; and
    an updating unit that updates contents element relevant information that is related with the contents elements based on the evaluations acquired.

11. The contents management apparatus according to claim 1, wherein
    the contents storage unit stores the contents elements in association with an updating date of the contents elements, and
    the contents element extracting unit extracts the contents elements based on the updating date.

12. The contents management apparatus according to claim 1, wherein
    the contents storage unit stores the contents elements in association with a creating date of the contents elements, and
    the contents element extracting unit extracts the contents elements based on the creating date.

13. The contents management apparatus according to claim 1, wherein
    the contents elements include at least one of moving image data and sound data,
    the contents storage unit stores the contents elements in association with a playing time of the contents elements, and
    the contents element extracting unit extracts the contents elements based on the playing time and a total playing time of the contents to be restructured.

14. The contents management apparatus according to claim 1, further comprising a specification acquiring unit that acquires specification information representing contents elements to be included in the contents that are restructured by the contents restructuring unit from the user, wherein
    the contents element extracting unit extracts the contents elements specified by the specification information acquired.

15. The contents management apparatus according to claim 1, wherein the contents restructuring unit restructures the contents elements based on a predetermined structuring order.

16. The contents management apparatus according to claim 1, wherein when the contents elements represent contents related to learning and when the contents elements are corresponding to a level of the learning, the contents restructuring unit restructures the contents elements based on the level of the learning.

17. The contents management apparatus according to claim 1, further comprising a similarity determining unit that determines similarity between the contents elements to be restructured by the contents restructuring unit, wherein
   upon the similarity determining unit determining that two predetermined contents elements are similar, the contents restructuring unit includes only one of the two contents elements in the new contents.

18. The contents management apparatus according to claim 1, further comprising an accounting unit that collects billing information when the contents elements included in the new contents are related with the billing information.

19. The contents management apparatus according to claim 1, wherein
   the contents include lecture contents information having at least one of moving image data, sound data, and still image data, and meta contents description information related to the contents elements, and
   the meta contents description information includes lecture relevant information about a lecture and inter-contents-information representing a relation between the contents elements.

20. The contents management apparatus according to claim 1, wherein
   the education curriculum determining unit determines, based on the contents request information, necessary learning items from a contents database storing the education curriculum including a plurality of learning items having a hierarchy structure, each learning item being associated with at least one of the contents elements, and
   the contents element extracting unit extracts the contents elements associated with the necessary learning items.

21. The contents management apparatus according to claim 1, where in forming the new contents, the contents restructuring unit selectively removes content elements previously viewed by the user.

22. A contents management system comprising:
   a contents management apparatus that manages contents including a plurality of contents elements representing information to be provided to a user; and
   a contents providing apparatus that provides the contents to the user, wherein the contents providing apparatus includes
      a contents request acquiring unit that acquires contents request information from the user;
      an education curriculum determining unit that receives the contents request from the acquiring unit and determines an education curriculum based on the information in the contents request;
      a contents element extracting unit that extracts the contents elements based on the education curriculum and the contents request information when the contents request acquiring unit acquires the contents request information from the user;
      a contents restructuring unit that restructures new contents from the contents elements extracted, where in forming the new contents, the contents restructuring unit selectively removes content elements previously viewed by the user;
      a contents providing unit that provides the new contents to the; and
      a contents storage unit that stores the contents,
      wherein the contents element extracting unit extracts the contents elements from the contents stored in the contents storage unit,
      the contents elements include information on lecturers,
      the contents storage unit stores the contents elements in association with popularity of the lecturers, and
      the contents element extracting unit extracts the contents elements based on the popularity, and
   the contents management apparatus and the contents providing apparatus communicate with each other via a network.

23. The contents management system according to claim 22, wherein
   the contents providing apparatus further includes a user information storage unit that stores user relevant information about the user to whom the contents are provided, and
   the contents element extracting unit extracts the contents elements based on the user relevant information stored in the user information storage unit.

24. A contents management system comprising:
   a contents management apparatus that manages contents including a plurality of contents elements representing information to be provided to a user; and
   a contents providing apparatus that provides the contents to the user, wherein the contents management apparatus includes
      a contents request acquiring unit that acquires contents request information from the user;
      an education curriculum determining unit that receives the contents request from the acquiring unit and determines an education curriculum based on the information in the contents request;
      a contents element extracting unit that extracts the contents elements based on the education curriculum and the contents request information when the contents request acquiring unit acquires the contents request information from the user;
      a contents restructuring unit that restructures new contents from the contents elements extracted, where in forming the new contents, the contents restructuring unit selectively removes at least one content element previously viewed by the user; and
      a contents providing unit that provides the new contents to the user; and
      a contents storage unit that stores the contents,
      wherein the contents element extracting unit extracts the contents elements from the contents stored in the contents storage unit,
      the contents elements include information on lecturers,
      the contents storage unit stores the contents elements in association with popularity of the lecturers, and
      the contents element extracting unit extracts the contents elements based on the popularity, wherein
   the contents providing apparatus includes an output unit that outputs the contents acquired from the contents providing apparatus via a network; and
   a user information storage unit that stores user relevant information about the user to whom the contents are provided,
   the contents element extracting unit alternatively extracts the contents elements based on the user relevant information stored in the user information storage unit, and
   the contents element extracting unit of the contents management apparatus extracts the contents elements determined based on the user relevant information stored in the user information storage unit.

25. A method of managing contents including a plurality of contents elements, representing information to be provided to a user, comprising:

storing content elements which include information on lecturers in association with popularity of the lecturers;

acquiring contents request information from the user;

determining, using a processor, an education curriculum based on the information in the contents request;

extracting the contents elements based on the popularity, the education curriculum, and the contents request information when a contents request acquiring unit acquires the contents request information from the user;

restructuring new contents from the contents elements extracted; and selectively removing content elements previously viewed by the user.

26. A computer readable recording medium that stores a computer program that realizes a method of managing contents including a plurality of contents elements representing information to be provided to a user on a computer, and a plurality of contents to which the computer program refers, wherein the computer program makes the computer execute:

storing content elements which include information on lecturers in association with popularity of the lecturers;

acquiring contents request information from the user;

determining an education curriculum based on the information in the contents request;

extracting the contents elements based on the popularity, the education curriculum and the contents request information when contents request acquiring unit acquires the contents request information from the user; and restructuring new contents from the contents elements extracted; and selectively removing content elements previously viewed by the user.

\* \* \* \* \*